US011936595B2

(12) United States Patent
Luo et al.

(10) Patent No.: US 11,936,595 B2
(45) Date of Patent: Mar. 19, 2024

(54) SUPPORTING SIMULTANEOUS OPERATION WITH PAIRED SPECTRUM FOR IAB

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Junyi Li, Fairless Hills, PA (US); Naeem Akl, Somerville, NJ (US); Tao Luo, San Diego, CA (US); Karl Georg Hampel, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 17/647,940

(22) Filed: Jan. 13, 2022

(65) Prior Publication Data

US 2022/0239449 A1    Jul. 28, 2022

Related U.S. Application Data

(60) Provisional application No. 63/143,014, filed on Jan. 28, 2021.

(51) Int. Cl.
*H04L 5/00* (2006.01)
*H04L 5/14* (2006.01)
*H04W 88/14* (2009.01)

(52) U.S. Cl.
CPC .......... *H04L 5/0094* (2013.01); *H04L 5/1469* (2013.01); *H04W 88/14* (2013.01)

(58) Field of Classification Search
CPC ..... H04L 5/0094; H04L 5/1469; H04W 88/14
See application file for complete search history.

(56) References Cited

U.S. PATENT DOCUMENTS

2021/0127293 A1* 4/2021 Hong .................... H04W 24/08
2022/0191832 A1* 6/2022 Yokomakura ......... H04W 72/23

* cited by examiner

*Primary Examiner* — Jianye Wu
(74) *Attorney, Agent, or Firm* — Procopio, Cory, Hargreaves & Savitch LLP

(57) ABSTRACT

A method, a computer-readable medium, and an apparatus are provided. The apparatus may be an IAB node. The apparatus may receive communication from one or more of a parent IAB node or a child IAB node using a first frequency carrier of a paired spectrum comprising the first frequency carrier and a second frequency carrier. The apparatus may transmit communication to the one or more of the parent IAB node or the child IAB node using the second frequency carrier in the paired spectrum. At least one of the first frequency carrier or the second frequency carrier in the paired spectrum carries both uplink and downlink communication.

30 Claims, 15 Drawing Sheets

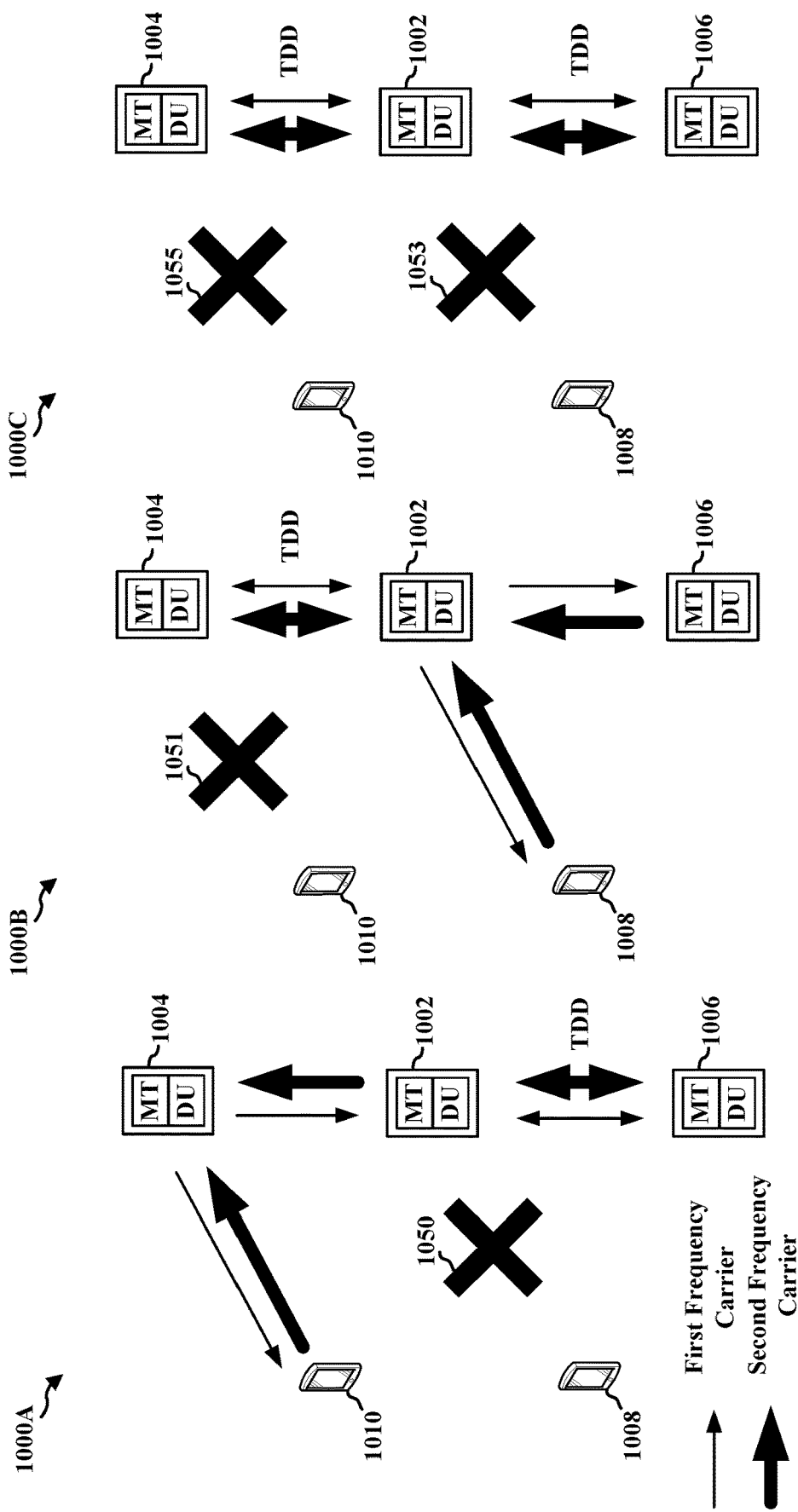

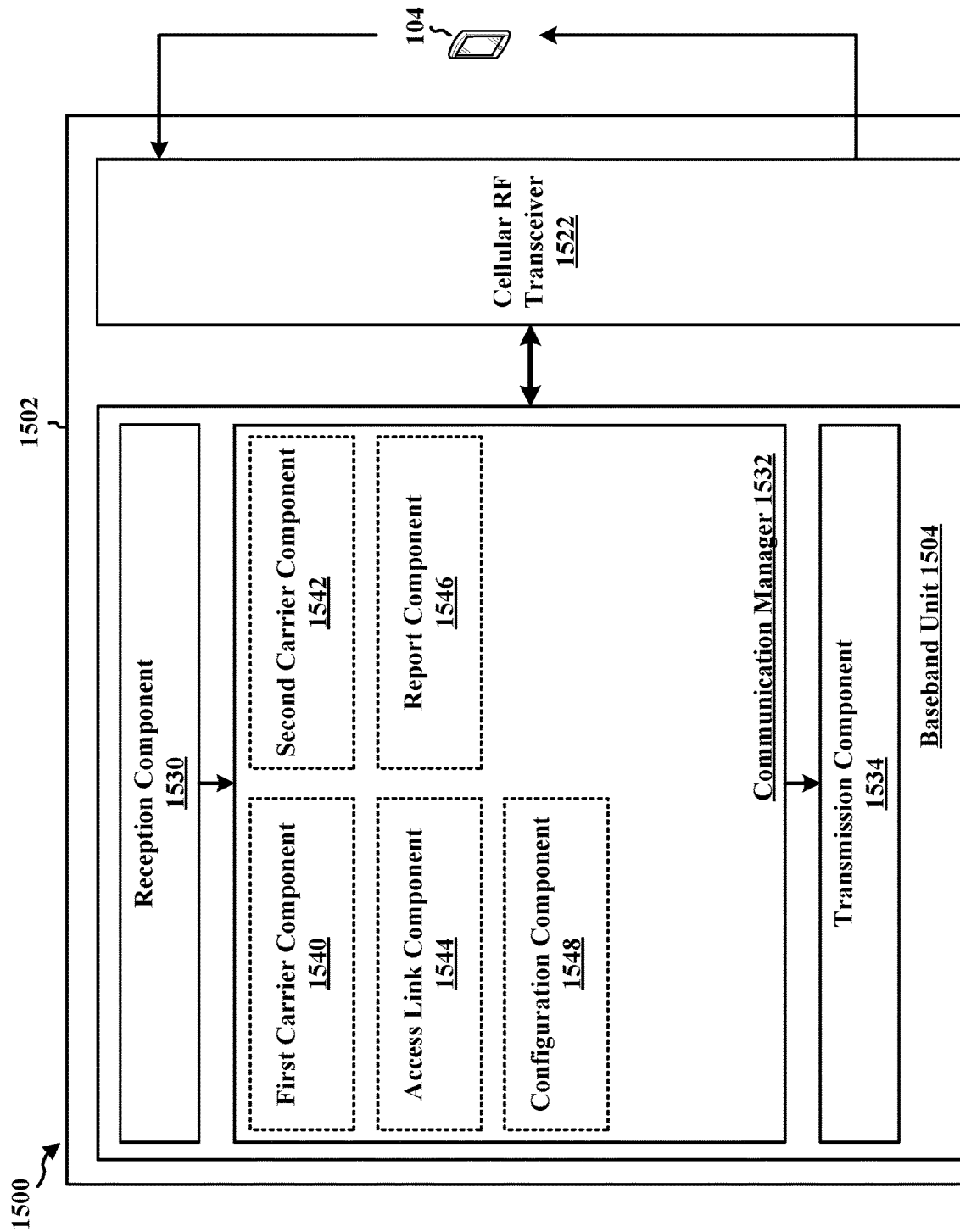

SUPPORTING SIMULTANEOUS OPERATION WITH PAIRED SPECTRUM FOR IAB

CROSS REFERENCE TO RELATED APPLICATION(S)

This application claims the benefit of and priority to U.S. Provisional Application Ser. No. 63/143,014, entitled "Supporting Simultaneous Operation with Paired Spectrum for TAB" and filed on Jan. 28, 2021, which is expressly incorporated by reference herein in its entirety.

TECHNICAL FIELD

The present disclosure relates generally to communication systems, and more particularly, to communication of an integrated access and backhaul (TAB) node over a paired spectrum.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be an IAB node. The apparatus may receive communication from one or more of a parent IAB node or a child IAB node using a first frequency carrier of a paired spectrum including the first frequency carrier and a second frequency carrier. The apparatus may transmit communication to the one or more of the parent IAB node or the child IAB node using the second frequency carrier in the paired spectrum. At least one of the first frequency carrier or the second frequency carrier in the paired spectrum carries both uplink and downlink communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 10A-10C are diagrams illustrating communications between IAB nodes according to aspects.

FIG. 15 is a diagram illustrating an example of a hardware implementation for an example apparatus.

DETAILED DESCRIPTION

Figure 1:
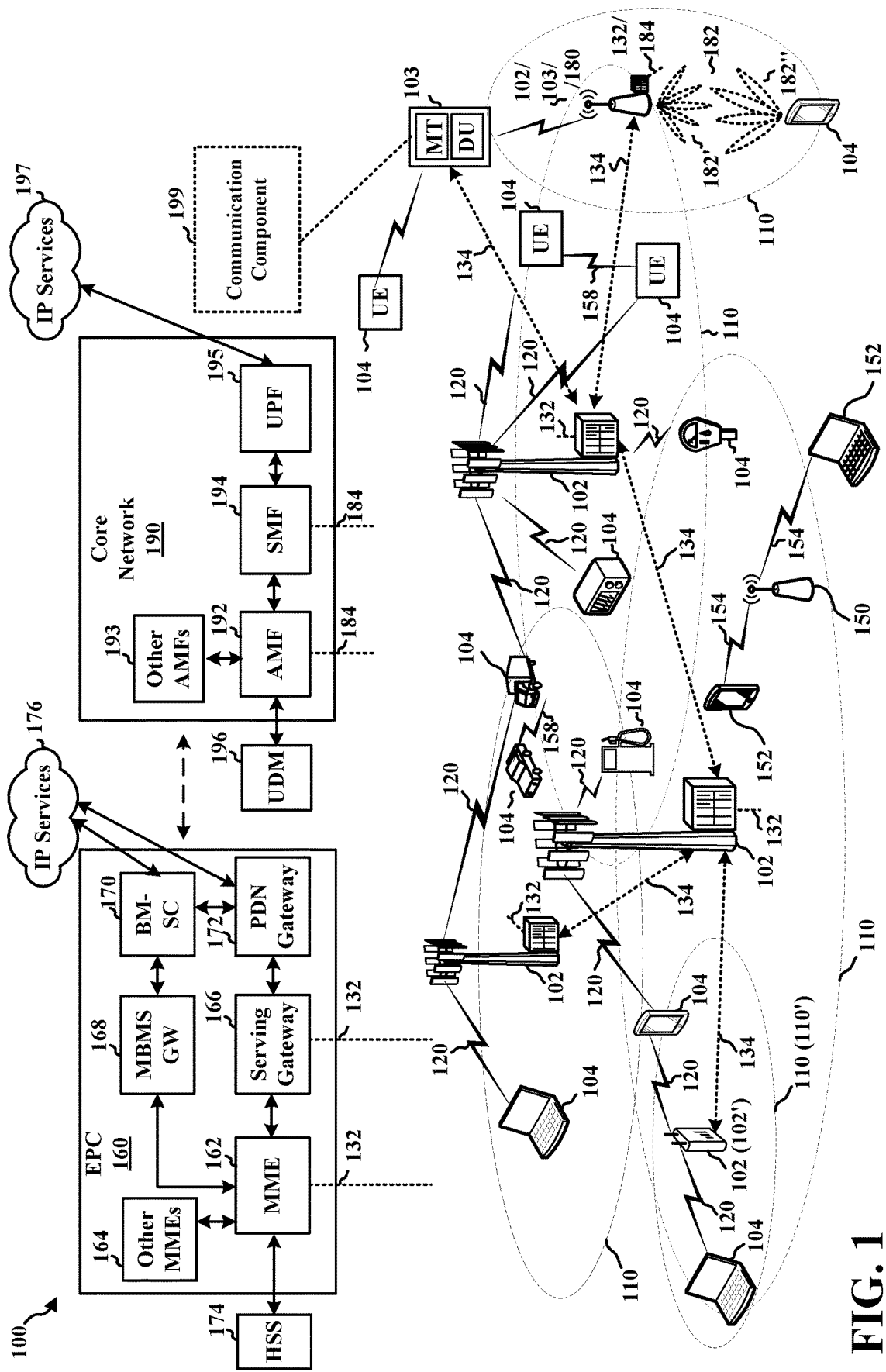
FIG. 1 is a diagram illustrating an example of a wireless communications system and an access network including one or more IAB nodes.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, an IAB node 103 may include a communication component 199 that may be configured to receive communication from one or more of a parent IAB node or a child IAB node using a first frequency carrier of a paired spectrum including the first frequency carrier and a second frequency carrier. The communication component 199 may be configured to transmit communication to the one or more of the parent IAB node or the child IAB node using the second frequency carrier in the paired spectrum. At least one of the first frequency carrier or the second frequency carrier in the paired spectrum carries both uplink and downlink communication. Although the following description may be focused on 5G NR, the concepts described herein may be applicable to other similar areas, such as LTE, LTE-A, CDMA, GSM, and other wireless technologies.

Figure 2:
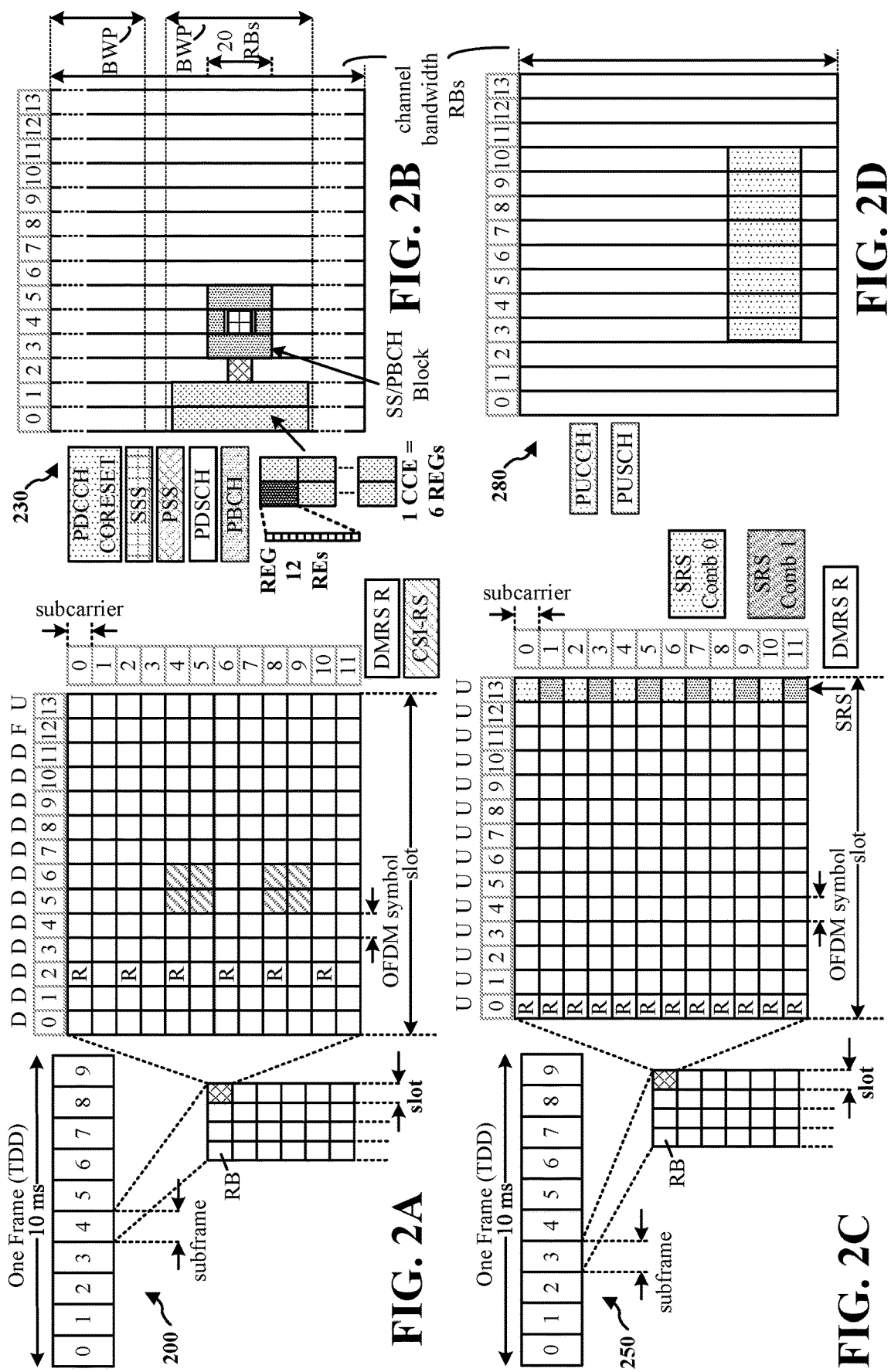
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$<br>[kHz] | Cyclic<br>prefix |
|---|---|---|
| 0 | 15 | Normal |
| 1 | 30 | Normal |
| 2 | 60 | Normal,<br>Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
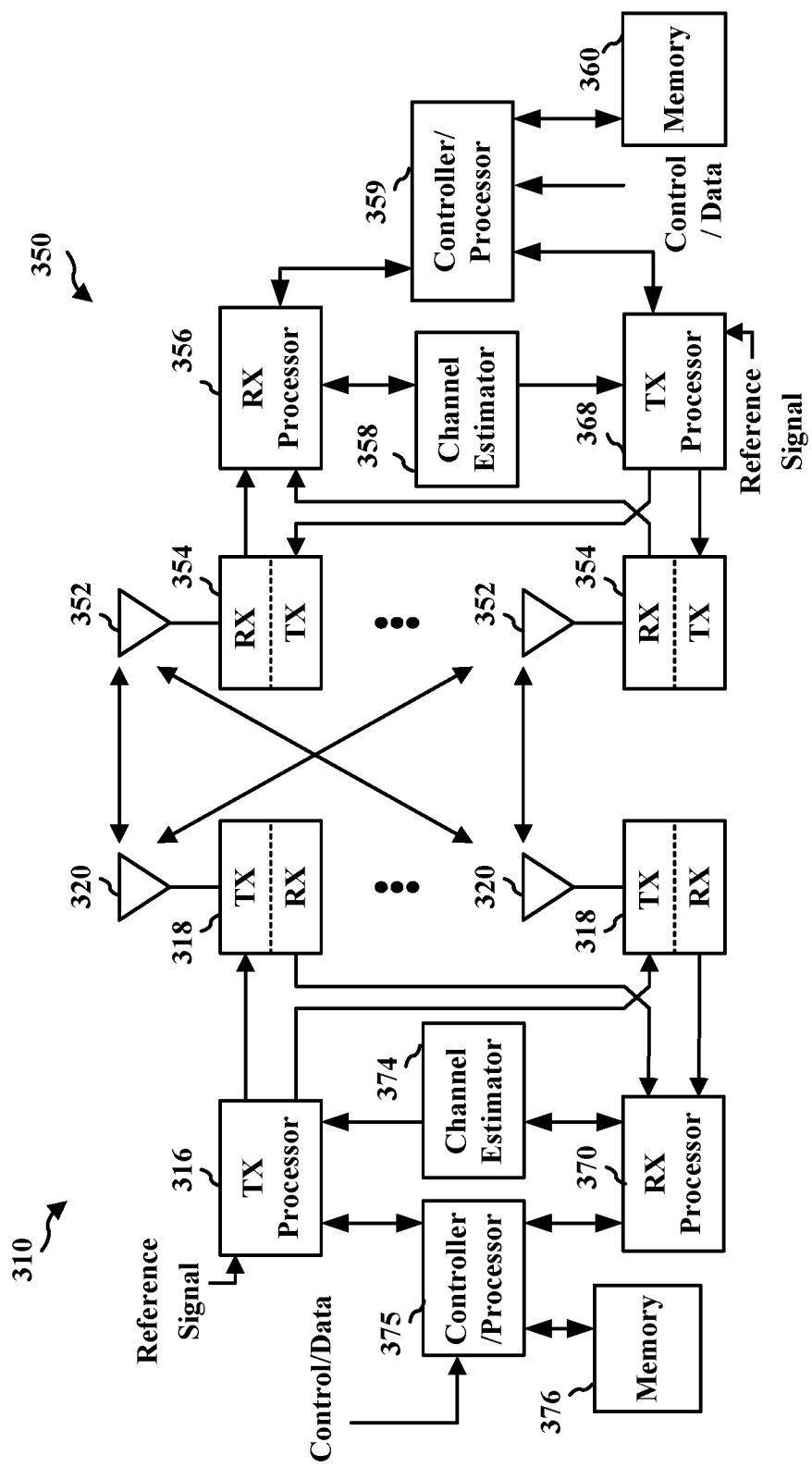
FIG. 3 is a diagram illustrating an example of a first wireless device and a second wireless device in an access network.

FIG. 3 is a block diagram of a first wireless device 310 in communication with a second wireless device 350 in an access network. In some aspects, the device 310 may correspond to a base station and the device 350 may correspond to a UE. In some aspects, the device 310 may correspond to a base station and the device 350 may correspond to an IAB node. In some aspects, the device 310 may correspond to an IAB node and the device 350 may correspond to a child IAB node or a UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

In some aspects, at least one of the TX processor 316, the RX processor 370, and the controller/processor 375 may be configured to perform aspects in connection with 199 of FIG. 1.

Figure 4:
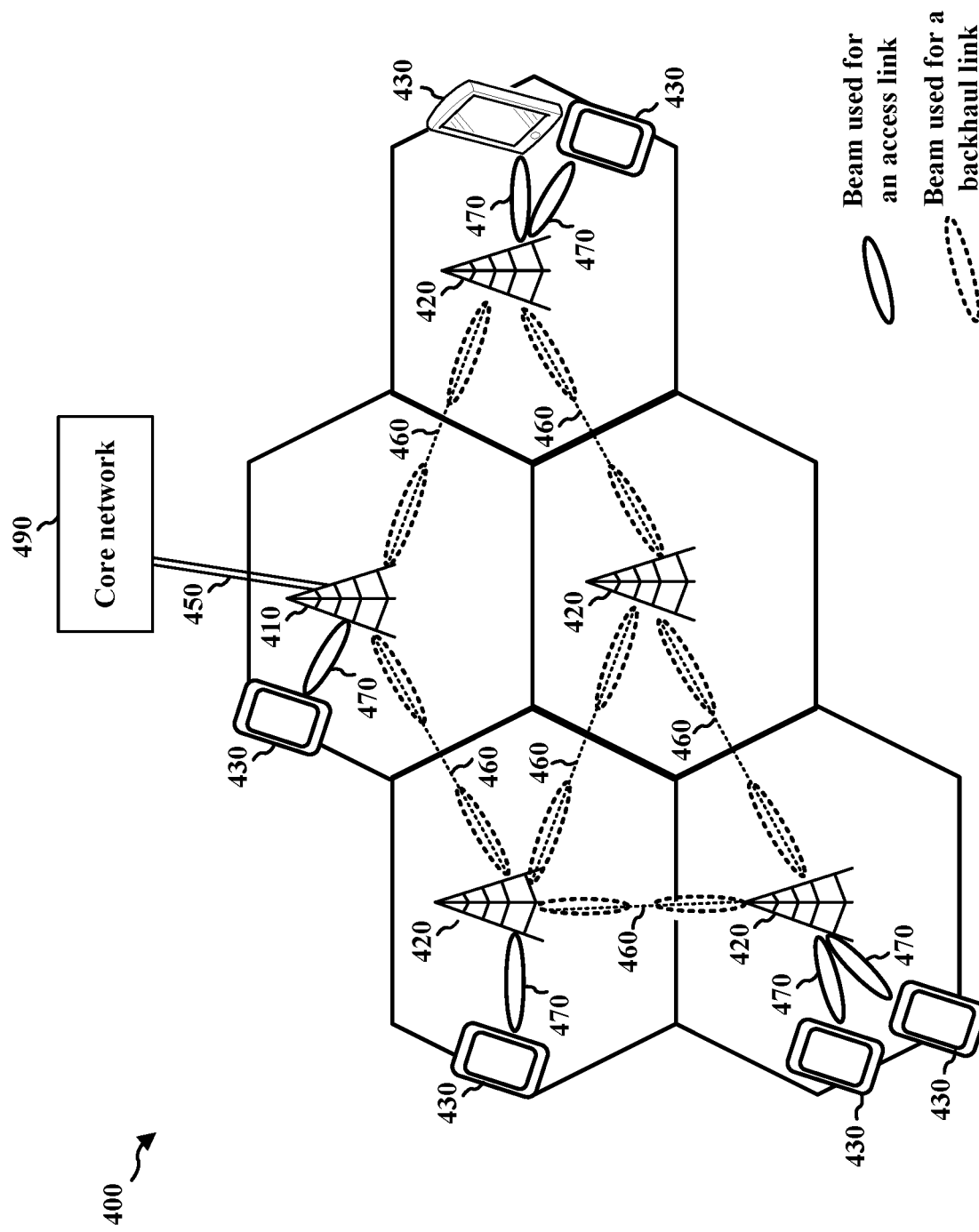
FIG. 4 is a diagram illustrating an IAB network.

FIG. 4 is a diagram illustrating an IAB network 400. The IAB network provides access network functionality between access nodes (ANs) and other ANs/UEs, and backhaul network functionality between ANs. The ANs include IAB donors, which have a wireline connection to the core network, and IAB nodes, which operate wirelessly and relay traffic to/from IAB donors through one or more AN hops. The IAB ANs share resources between the access and the backhaul. That is, the resources used for access communication between the ANs and ANs/UEs are also used for backhaul communication between the ANs.

The IAB network 400 may include an anchor node (that may be referred to herein as an "IAB donor" or "IAB donor node") 410 and access nodes (that may be referred to herein as "IAB nodes") 420. The IAB donor 410 may be a base station, such as a gNB or eNB, and may perform functions to control the IAB network 400. The IAB nodes 420 may include layer 2 (L2) relay nodes, etc. Together, the IAB donor 410 and the IAB nodes 420 share resources to provide an access network and a backhaul network to the core network 490. For example, resources may be shared between access links and backhaul links in the IAB network.

The UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. The UEs 430 communicate with the core network by relaying messages through their respective access link 470 to the IAB network 400, which then may relay the message through backhaul links 460 to the IAB donor 410 to communicate with the core network 490 through the wireline backhaul link 450. Similarly, the core network 490 may communicate with a UE 430 by sending a message to the IAB donor 410 through the wireline backhaul link 450. The IAB donor 410 sends the message through the IAB network 400 via backhaul links 460 to the IAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for the IAB donor 410 or the IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that may be based on the PCI used by the respective IAB node.

Figure 5:
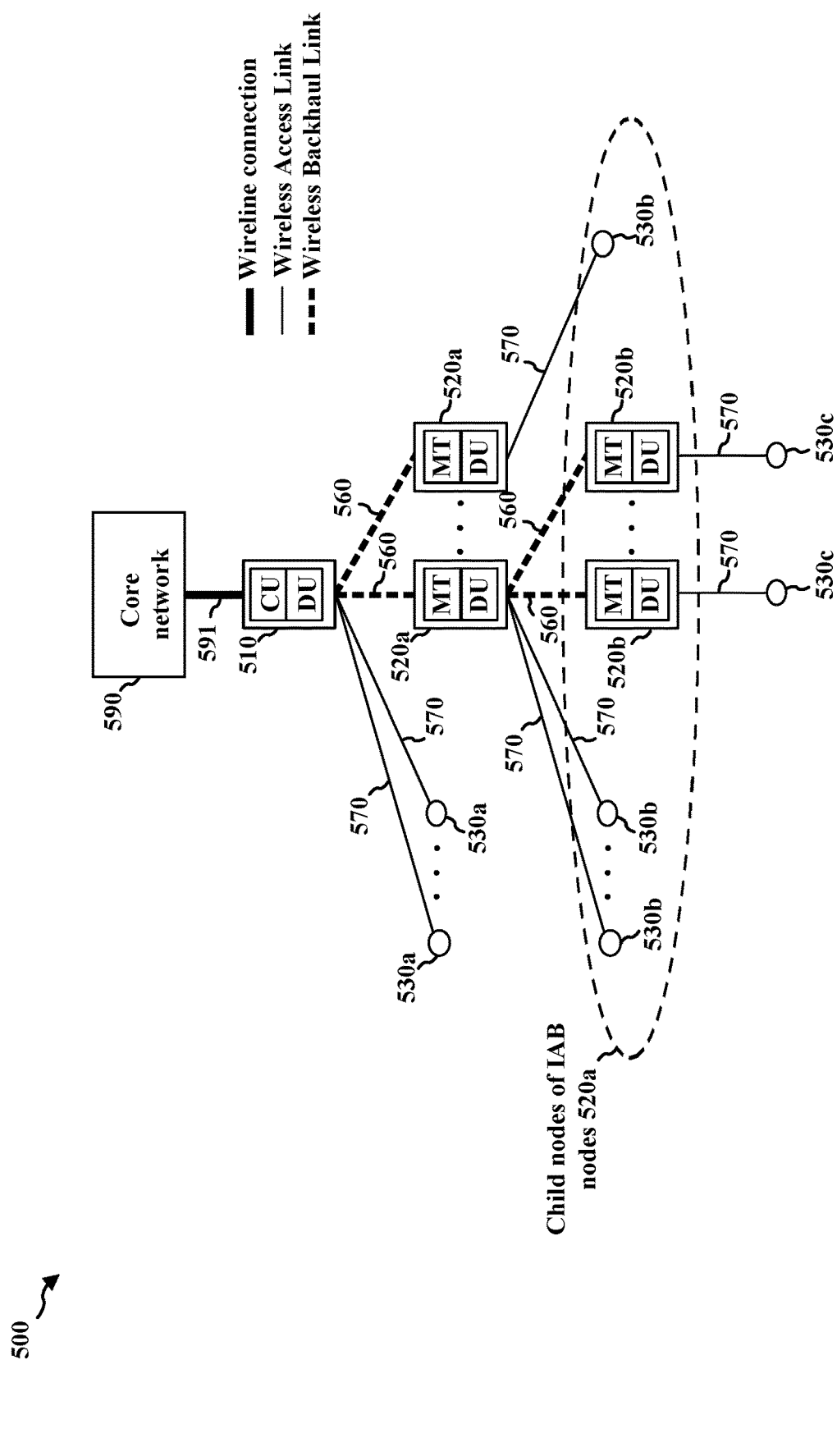
FIG. 5 illustrates a second diagram illustrating an IAB network and components thereof.

FIG. 5 is a diagram illustrating an IAB network 500 and components thereof. The IAB network 500 includes an IAB donor 510 and IAB nodes 520a and 520b. The IAB nodes 520a-520b, as well as the IAB donor node 510, may provide wireless access links to UEs 530a-530c.

The IAB donor node 510 may be considered a root node of the tree structure of the IAB network 500. The IAB donor node 510 may be connected to the core network 590 via a wired connection 591. The wired connection may include, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor node 510. The IAB donor node 510 may be connected to its child IAB nodes 520a via backhaul links 560, and may be connected to the child UEs 530a via access links 570. The IAB nodes 520a that are child nodes of IAB node 510 may also have IAB node(s) 520b and/or UE(s) 530b as child nodes. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The CU may provide control for the IAB nodes 520a, 520b in the IAB network 500. For example, the CU may control the IAB network 500 through configuration. The CU may perform RRC/PDCP layer functions. The IAB donor nodes 510 further include a DU that may perform scheduling. For example, the DU may schedule resources for communication by the child IAB nodes 520a and/or UEs 530a of the IAB donor 510. The DU holds RLC, MAC, and physical (PHY) layer functions. One IAB donor CU may be associated with multiple IAB donor DUs.

The IAB nodes 520a, 520b may include a mobile termination (MT) and a DU. The IAB node may be an L2 relay node. The MT of IAB node 520a may operate as a scheduled node that may be scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. An IAB node may provide a connection to an IAB node that in turn provides another connection to another IAB node. The pattern of a parent IAB node including a DU that schedules a child IAB node/child UE may continue to more connections than illustrated in FIG. 5.

Figures 6A, 6B, 6C:
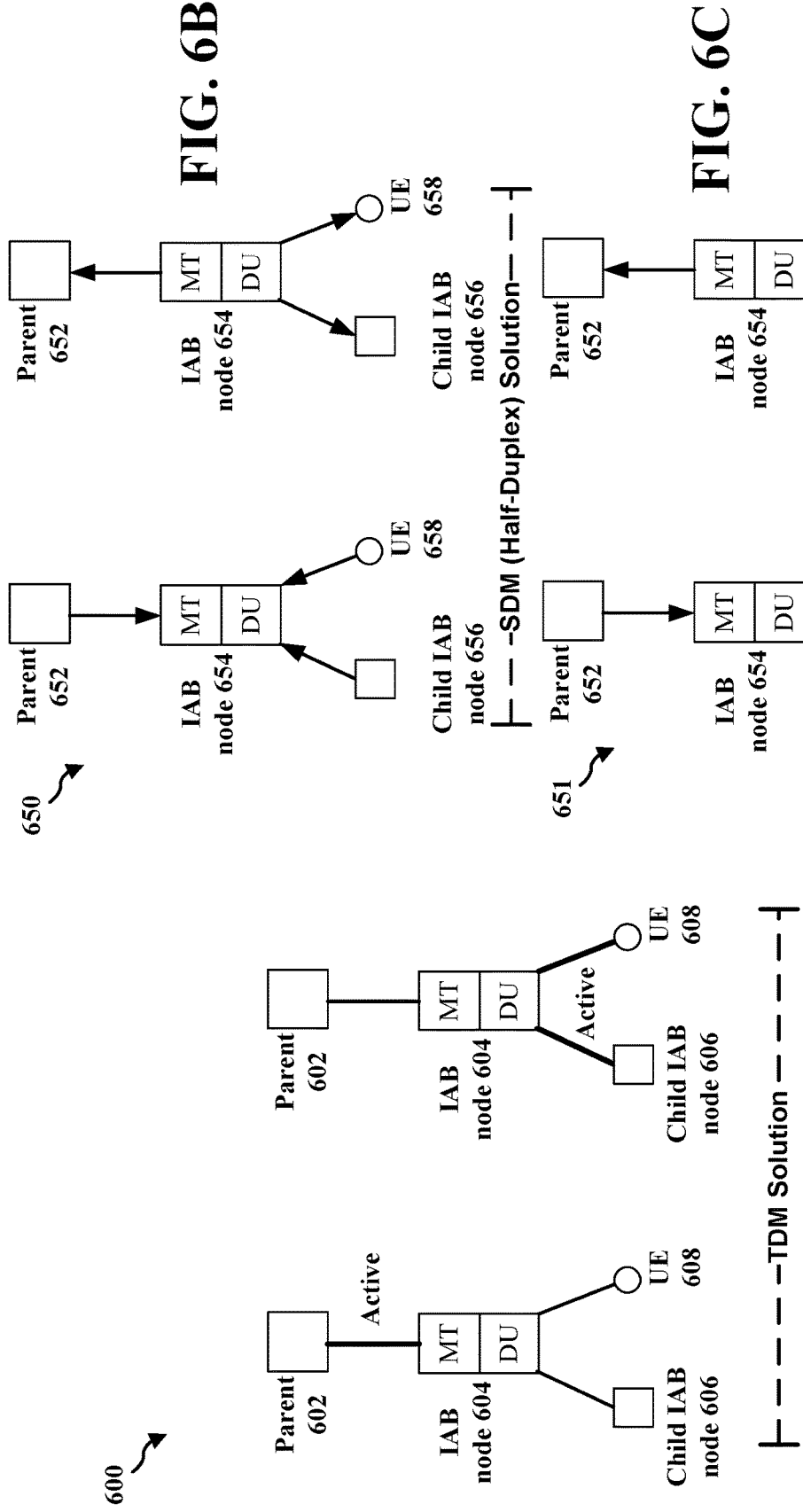
FIGS. 6A-6C are diagrams illustrating example nodes.

FIGS. 6A-6C are diagrams 600, 650, 651, respectively, illustrating example duplex capabilities for IAB nodes. As shown in FIG. 6A, diagram 600 includes the parent node 602, the IAB node 604, the child IAB node 606, and the UE 608. FIG. 6A displays one example of a time division multiplexing (TDM) operation at the IAB node 604. In particular, the parent link and the child links may be time division multiplexed so that the IAB node 604 exchanges communication with the parent node 602 at different times than the IAB node 604 exchanges communication with the child IAB node 606 or the UE 608, e.g., without overlapping communication using both the MT and DU of the IAB node 604.

In FIGS. 6B and 6C, the diagrams 650, 651 include the parent nodes 652, the IAB node 654, the child IAB node 656, and the UE 658. FIG. 6B displays one example of half-duplex operation of the IAB node 654 using spatial division multiplexing (SDM). In particular, simultaneous SDM MT-RX/DU-RX, or simultaneous SDM MT-TX/DU-TX may be enabled. For example, the IAB node 654 may receive communication from the parent IAB node 652 that overlaps in time with reception of communication from a child IAB node 656 and/or UE 658, e.g., as shown in the diagram 650. Similarly, the IAB node 654 may transmit communication to the parent IAB node 652 that overlaps in time with transmissions to a child IAB node 656 and/or UE 658, e.g., as shown in the diagram 650. The half-duplex operation may be based on SDM, e.g., in which the IAB node 654 uses different beams or antenna panels to communicate with the parent IAB node 652 and the child IAB node 656/UE 658. Thus, although the transmissions may overlap in time, the transmissions may be transmitted in different directions, e.g., using different beams or antenna panels. Similarly, although reception may overlap in time, the reception may be performed using different beams/antenna panels/directions.

FIG. 6C displays one example of full-duplex operation of the IAB node 654. The full-duplex operation may be based on SDM, e.g., as described in connection with the diagram 650. However, in contrast to FIG. 6B, in FIG. 6C the IAB node 654 may simultaneously receive from the parent IAB node 652 while transmitting to the child IAB node 656 and/or the UE 658. Similarly, the IAB node 654 may transmit to the parent IAB node 652 at a time that overlaps with reception from the child IAB node 656 and/or the UE 658. In particular, simultaneous MT-RX/DU-TX, or simultaneous MT-TX/DU-RX may be enabled. Aspects presented herein provide techniques to enable simultaneous MT-RX/MT-TX/DU-RX/DU-TX, e.g., half-duplex and/or full-duplex operation, at the IAB node 654.

IAB nodes can utilize DU resources based on a number of DU resource attributes, such as hard (H) resources, not available (NA) resources, or soft (S) resources. A DU may use an H resource unconditionally. The use of the H resource is optional for the DU, and the DU may or may not use the H resource. The DU may not use an NA resource, with an exception if the DU matches an allocation for a number of cell-specific signals or channels. For example, an exception can apply to SSB transmission (both cell-defining SSB (CD-SSB) and non-CD-SSB), RACH receptions, periodic CSI-RS transmissions, and scheduling request (SR) receptions. The DU may use an S resource if a condition is satisfied or true. In some aspects, the conditions can include or be based on an indication, such as an explicit indication where the parent node sends an indication to release the resource. In some aspects the condition may include or be based on an implicit determination, e.g., where the node determines that the use of the DU resource does not impact a task for the MT, e.g., which the MT is expected to perform. The DU may apply the same exception as the NA case above for cell-specific signals or channels.

A paired spectrum may include a pair of frequency carriers (e.g., a first frequency carrier and a second frequency carrier). As an example, a paired spectrum may be used in connection with NR communication. The paired spectrum may be in a band associated with FDD transmission (e.g., an FR1 band). A band associated with FDD transmissions may include a downlink frequency range and an uplink frequency range, which may be separated in frequency so that transmission on one frequency range does not cause interference (e.g., does not cause more than a threshold amount of interference) to reception of a transmission on the other frequency range. For example, the first frequency carrier may be one of downlink carriers (e.g., $f_{DL}$) in the downlink frequency range, and the second frequency carrier may be one of uplink carriers (e.g., $f_{UL}$) in the uplink frequency range. Thus, a paired spectrum may include a pair of ($f_{DL}$,$f_{UL}$). The downlink frequency carrier of the paired spectrum (e.g., $f_{DL}$) may carry downlink channels (e.g., the SSB, the CSI-RS, the PDCCH, the PDSCH), and the uplink frequency carrier (e.g., $f_{UL}$) may carry uplink channels (e.g., the PRACH, the PUCCH, the SRS, the PUSCH). A serving cell of a UE may be configured with the pair of the downlink frequency carrier and the uplink frequency Carrier ($f_{DL}$,$f_{UL}$).

For an access network, downlink may refer to the communication direction from the base station to the UE, and uplink may refer to the communication direction from the UE to the base station. For an IAB network, between two IAB nodes with a direct connection, downlink may refer to the communication direction from the parent IAB node DU to the child IAB node MT and/or a UE, and uplink may refer to the communication direction from the child IAB node MT and/or UE to the parent IAB node DU. In a paired spectrum ($f_{DL}$,$f_{UL}$), the downlink (first) frequency carrier may be used for the downlink communication from the parent IAB node DU to the child IAB node MT and/or a UE, and the uplink (second) frequency carrier may be used for the uplink communication from the child IAB node MT and/or UE to the parent IAB node DU.

Figure 7B:
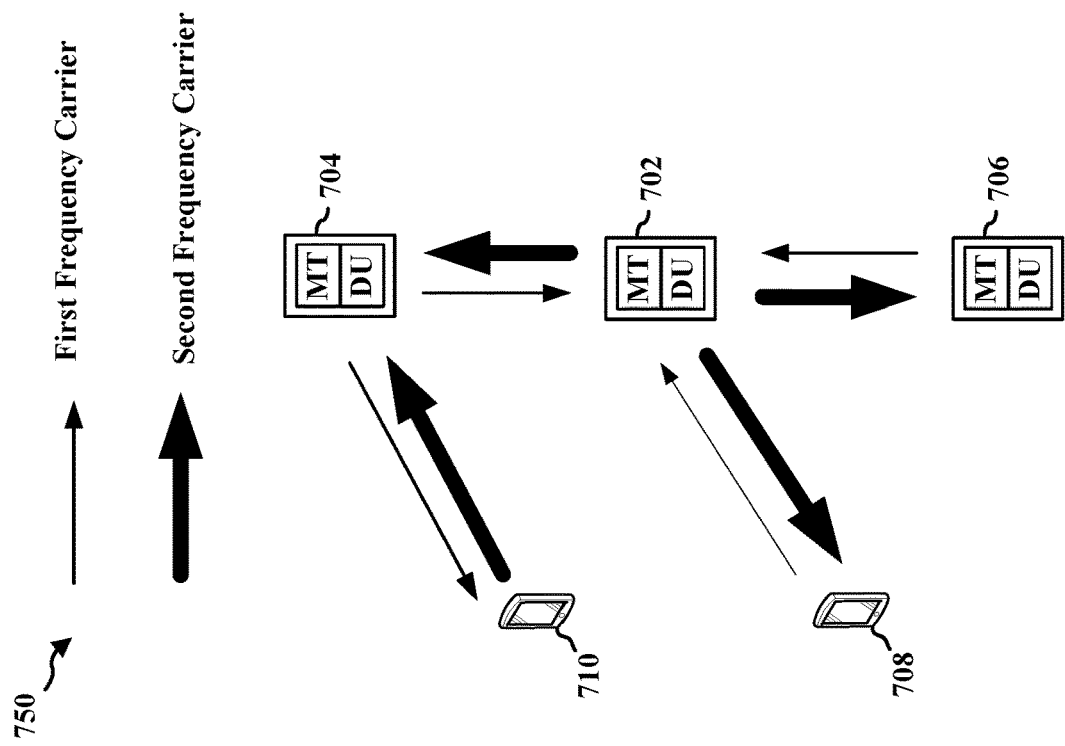
FIGS. 7A and 7B are diagrams illustrating communications between IAB nodes.
Figure 7A:
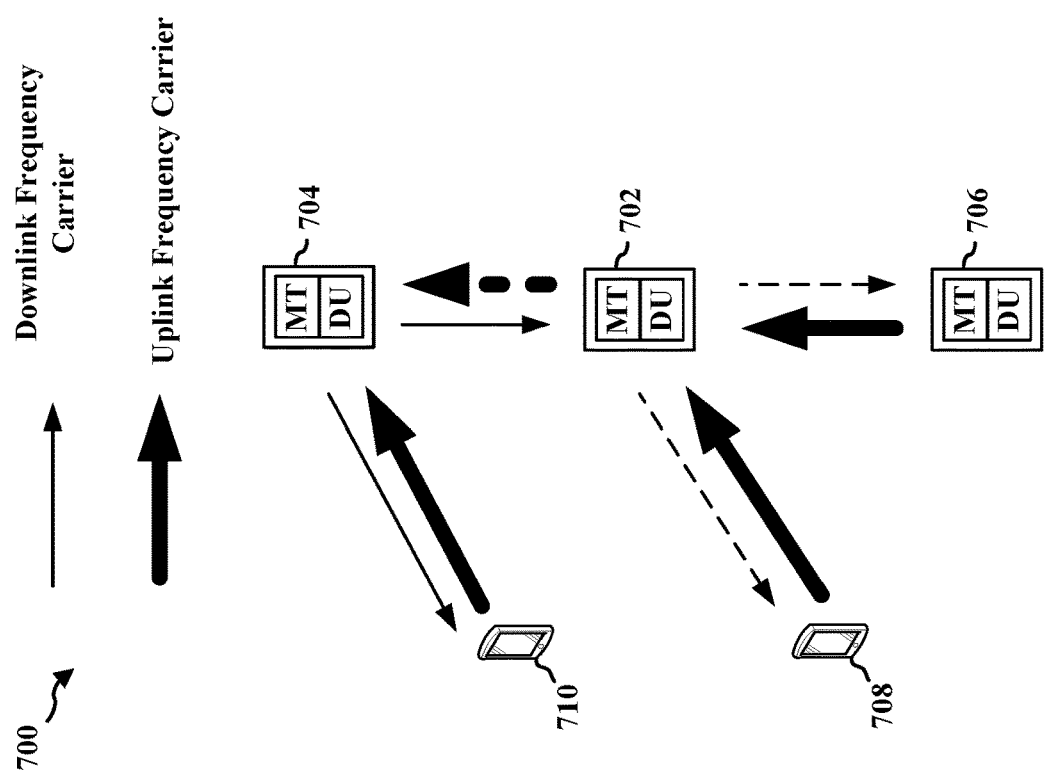

FIG. 7A is a diagram 700 illustrating communications between IAB nodes using a paired spectrum ($f_{DL}$,$f_{UL}$). The IAB node 704 may be the parent IAB node to the IAB node 702, and the IAB node 706 may be a child IAB node to the IAB node 702. The IAB node 702 may serve as the AN to the UE 708. The parent IAB node 704 may serve as the AN to the UE 710. The IAB node 702 may communicate with other devices over a paired spectrum based on FDD. Here, similar to the IAB node 654 in FIG. 6B, the IAB node 702, which may not support full-duplex operations (due, e.g., to inability to cancel the strong interference), may perform simultaneous SDM MT-RX/DU-RX, or simultaneous SDM MT-TX/DU-TX. However, as the IAB node 702 may not support full-duplex operations, TDM may be used between the RX and the TX. In other words, MT-RX/DU-RX and the MT-TX/DU-TX may be performed in different time slots. Further, when performing simultaneous SDM MT-RX/DU-RX, the IAB node 702 may perform MT-RX in receiving downlink communication using the downlink frequency carrier, and may perform DU-RX in receiving uplink communication using the uplink frequency carrier. Similarly, the IAB node 702 may transmit uplink communication using the uplink frequency carrier and transmit downlink communication using the downlink frequency carrier, as shown by the dashed lines in FIG. 7A. The MT-RX and the DU-RX may be performed simultaneously with both SDM and FDM, which may represent less efficient spectral resource utilization. Similarly, the simultaneous MT-TX/DU-TX may actually be performed with both SDM and FDM, which may be less efficient.

FIG. 7B illustrates an example 750 that provides improved resource utilization in which the IAB node 702 is configured with a paired spectrum including a first frequency carrier and a second frequency carrier. The IAB node 702 may use the first frequency carrier to receive communication, e.g., whether on the downlink from the parent IAB node 704 or on the uplink from the IAB child node 706. The IAB node 702 may use the second frequency carrier to transmit communication, e.g., whether on the uplink to the parent IAB node 704 or on the downlink to the IAB child node 706. The use of the first frequency carrier for the ingress of communication and the second frequency carrier for the egress of communication enables SDM-RX (e.g., downlink reception and uplink reception that overlap in time) on the first frequency carrier and SDM-TX (e.g., uplink transmission and downlink transmission that overlap in time) on the second frequency carrier.

Figure 8:
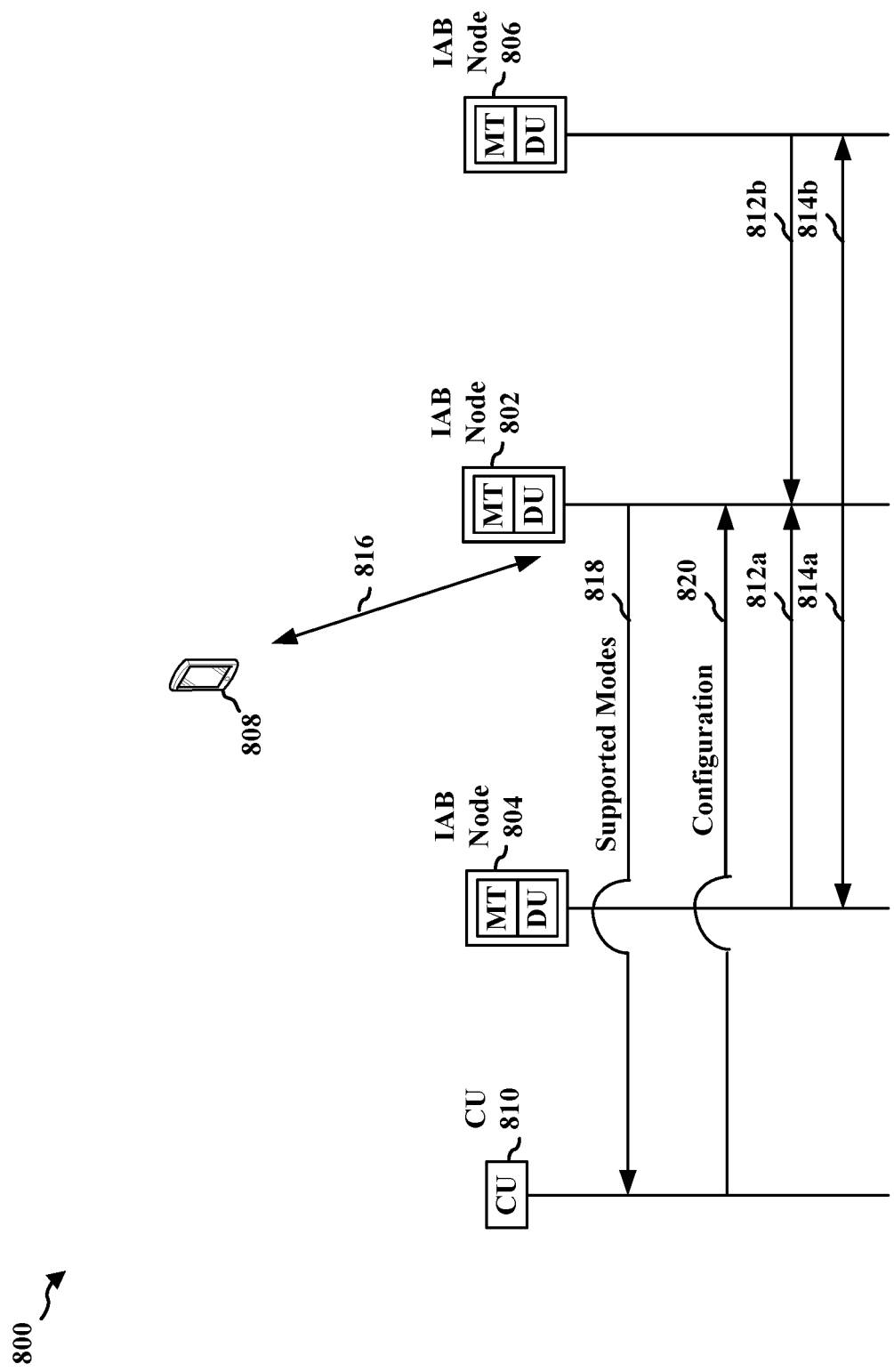
FIG. 8 is a diagram illustrating an example communication flow according to aspects.

FIG. 8 is a diagram illustrating an example communication flow 800 according to aspects presented herein. The IAB node 804 may be the parent IAB node to the IAB node 802, and the IAB node 806 may be a child IAB node to the IAB node 802. The IAB node 802 may serve as the AN to the UE 808. At 812a, 812b, the IAB node 802 may receive communication from one or more of a parent IAB node 804 or a child IAB node 806 using a first frequency carrier of a paired spectrum including a first frequency carrier and a second frequency carrier, such as described in connection with FIG. 7B. At 814a, 814b, the IAB node 802 may transmit communication to the one or more of the parent IAB node 804 or the child IAB node 806 using the second frequency carrier in the paired spectrum, e.g., as described in connection with FIG. 7B. At least one of the first frequency carrier or the second frequency carrier in the paired spectrum may carry both uplink and downlink communication. The uplink and downlink communication may be transmitted/received in a half-duplex mode for the IAB node 802.

Figures 9A, 9B:
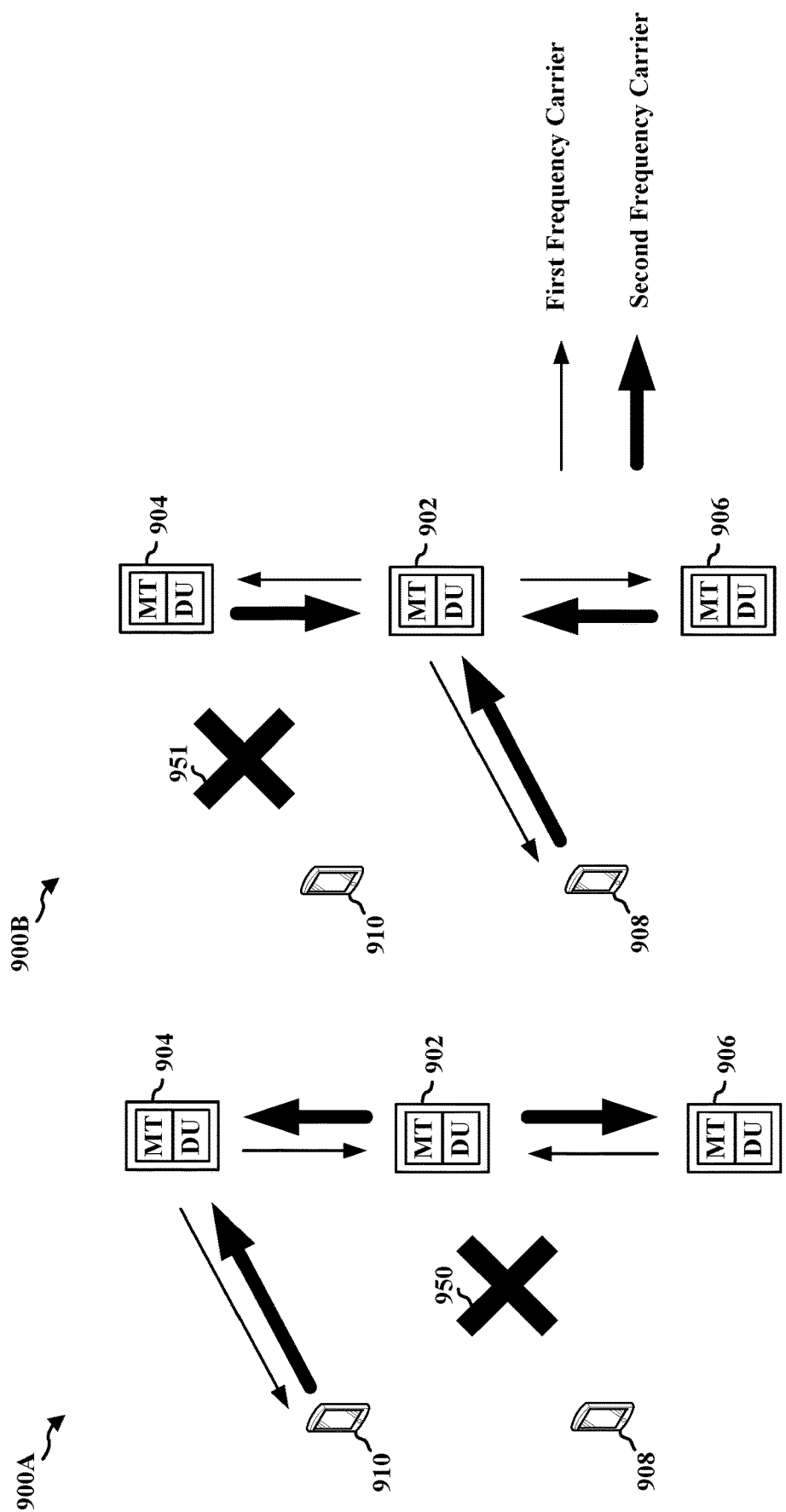
FIGS. 9A and 9B are diagrams illustrating communications between IAB nodes according to aspects.

FIGS. 9A and 9B are diagrams 900A, 900B illustrating communications between IAB nodes according to aspects presented herein. The IAB nodes 902, 904, 906 may correspond to the IAB nodes 802, 804, 806 in FIG. 8, respectively. The UE 908 may correspond to the UE 808 in FIG. 8. Further, the parent IAB node 904 may serve as the AN for the UE 910. In different aspects, different configurations of at least one of the first frequency carrier or the second frequency carrier of the paired spectrum may be utilized between different neighboring IAB nodes in a multi-hop IAB topology. The different configurations may be mixed in the IAB topology as appropriate or suitable. In FIG. 9A, the IAB node 902 MT may receive from the parent IAB node 904 DU (i.e., downlink) over the first frequency carrier, and may transmit to the parent node 904 DU (i.e., uplink) over the second frequency carrier, based on FDD. Further, the IAB node 902 DU may receive from the child IAB node 906 MT (i.e., uplink) over the first frequency carrier, and may transmit to the child IAB node 906 MT (i.e., downlink) over the second frequency carrier, based on FDD. In other words, the first frequency carrier may be used for the uplink communication between the IAB node 902 and the child IAB node 906, and the second frequency carrier may be used for the downlink communication between the IAB node 902 and the child IAB node 906. Accordingly, the IAB node 902 may perform MT-RX/DU-RX/MT-TX/DU-TX simultaneously over the paired spectrum (e.g., the IAB node may perform simultaneous MT-RX/DU-RX over the first frequency carrier, and may at the same time perform simultaneous MT-TX/DU-TX over the second frequency carrier). Accordingly, higher or more efficient resource utilization may be achieved with the simultaneous operation with the paired spectrum. In some aspects, the UE 908 may not be able to detect the IAB node 902, as shown by 950, as the IAB node 902 DU uses the first frequency carrier for uplink communications and uses the second frequency carrier for downlink communications, and the UE 908 may not include the second frequency carrier as part of its initial search carrier frequencies.

In FIG. 9B, the IAB node 902 MT may receive from the parent IAB node 904 DU (i.e., downlink) over the second frequency carrier, and may transmit to the parent node 904 DU (i.e., uplink) over the first frequency carrier, based on FDD. Further, the IAB node 902 DU may receive from the child IAB node 906 MT (i.e., uplink) over the second frequency carrier, and may transmit to the child IAB node 906 MT (i.e., downlink) over the first frequency carrier, based on FDD. In other words, the first frequency carrier may be used for the uplink communication between the IAB node 902 and the parent IAB node 904, and the second frequency carrier may be used for the downlink communication between the IAB node 902 and the parent IAB node 904. Accordingly, similar to the configuration shown in FIG. 9A, the IAB node 902 may perform MT-RX/DU-RX/MT-TX/DU-TX simultaneously over the paired spectrum (e.g., the IAB node may perform simultaneous MT-TX/DU-TX over the first frequency carrier, and may at the same time perform simultaneous MT-RX/DU-RX over the second frequency carrier). In some aspects, the UE 908 may access the IAB node 902 as normal because the IAB node 902 DU uses the first frequency carrier for downlink communications and uses the second frequency carrier for uplink communications. However, the UE 910 may not be able to access the parent IAB node 904, as shown at 951, for similar reasons that the UE 908 may not be able to access the IAB node 902 in FIG. 9A.

FIGS. 10A-10C are diagrams 1000A, 1000B, and 1000C illustrating communications between IAB nodes according to aspects. The IAB nodes 1002, 1004, 1006 may correspond to the IAB nodes 802, 804, 806 in FIG. 8, respectively. The UE 1008 may correspond to the UE 808 in FIG. 8. Further, the parent IAB node 1004 may serve as the AN for the UE 1010. In FIG. 10A, the IAB node 1002 MT may receive from the parent IAB node 1004 DU (i.e., downlink) over the first frequency carrier, and may transmit to the parent node 1004 DU (i.e., uplink) over the second frequency carrier, e.g., based on a pair of a downlink frequency carrier and an uplink frequency carrier. Further, the IAB node 1002 DU may receive from and transmit to the child IAB node 1006 MT over one or more of the first frequency carrier or the second frequency carrier based on TDD. Each of the first frequency carrier or the second frequency carrier may be configured with its respective TDD pattern for the TDD communication. Accordingly, higher or more efficient resource utilization may be achieved with the simultaneous operation with the paired spectrum. In some aspects, a UE 1008 may not be able to access the IAB node 1002. When the first frequency carrier is not used between the IAB node 1002 DU and the child IAB node 1006 MT (e.g., when the second frequency carrier alone is used with TDD), the UE 1008 may not be able to detect the IAB node 1002, as shown at 1050, because the UE 908 may not include the second frequency carrier as part of its initial search carrier frequencies. Even when the first frequency carrier is used between the IAB node 1002 DU and the child IAB node 1006 MT, the UE 1008 may still not be able to access the IAB node 1002 because the UE 1008 may expect FDD communications over the paired spectrum. In this scenario, a MIB or a SIB (over the Uu interface) may be configured to indicate that the IAB node 1002 may be accessible to a child IAB node MT and not to a UE.

In FIG. 10B, the IAB node 1002 MT may receive from and transmit to the parent IAB node 1004 DU over one or more of the first frequency carrier or the second frequency carrier based on TDD. Each of the first frequency carrier or the second frequency carrier may be configured with its respective TDD pattern for the TDD communication. Further, the IAB node 1002 DU may transmit to the child node 1006 MT (i.e., downlink) over the first frequency carrier, and may receive from the child IAB node 1006 MT (i.e., uplink) over the first frequency carrier. Accordingly, higher or more efficient resource utilization may be achieved with the simultaneous operation with the paired spectrum. A UE 1008 may access the IAB node 1002 as normal because the IAB node 1002 DU uses the first frequency carrier for downlink communications and uses the second frequency carrier for uplink communications. However, a UE 1010 may not be able to access the parent IAB node 1004, as shown at 1051, for similar reasons that the UE 1008 may not be able to access the IAB node 1002 in FIG. 10A.

In FIG. 10C, the IAB node 1002 MT may receive from and transmit to the parent IAB node 1004 DU over one or more of the first frequency carrier or the second frequency carrier based on TDD. Each of the first frequency carrier or the second frequency carrier may be configured with its respective TDD pattern for the TDD communication. Further, the IAB node 1002 DU may receive from and transmit to the child node 1006 MT over one or more of the first frequency carrier or the second frequency carrier based on TDD. Each of the first frequency carrier or the second frequency carrier may be similarly configured with its respective TDD pattern for the TDD communication. Accordingly, higher or more efficient resource utilization may be achieved with the simultaneous operation with the paired spectrum. In one aspect, in some time slots, the IAB node 1002 MT may receive from and transmit to the parent IAB node 1004 DU simultaneously over both of the first frequency carrier and the second frequency carrier based on TDD. In the same aspect, in some other time slots, the IAB node 1002 DU may receive from and transmit to the child node 1006 MT simultaneously over both of the first frequency carrier and the second frequency carrier based on TDD. In other words, in this aspect, although the first frequency carrier and the second frequency carrier may be simultaneously utilized by the IAB node 1002, the IAB node 1002 may not simultaneously communicate with the parent IAB node 1004 and with the child IAB node 1006. The UEs 1008, 1010 may not be able to access the IAB nodes 1002, 1004, as shown at 1053 and 1055 respectively, for similar reasons that the UE 1008 may not be able to access the IAB node 1002 in FIG. 10A.

Figures 11A, 11B:
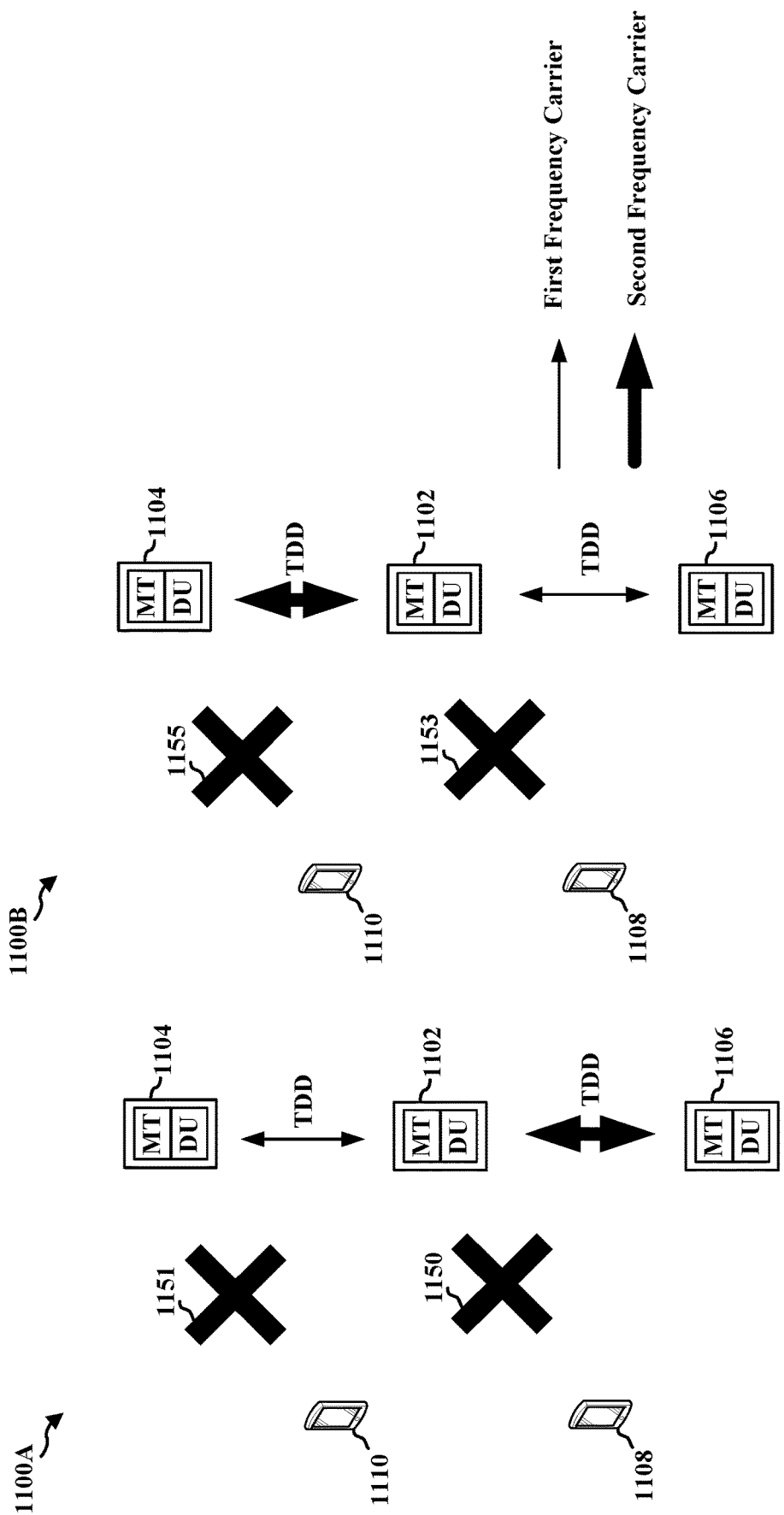
FIGS. 11A and 11B are diagrams illustrating communications between IAB nodes according to aspects.

FIGS. 11A and 11B are diagrams 1100A, 1100B illustrating communications between IAB nodes according to aspects. The IAB nodes 1102, 1104, 1106 may correspond to the IAB nodes 802, 804, 806 in FIG. 8, respectively. The UE 1108 may correspond to the UE 808 in FIG. 8. Further, the UE 1110 may attempt to access the parent IAB node 1104. In FIG. 11A, the IAB node 1102 MT may receive from and transmit to the parent IAB node 1104 DU over the first frequency carrier based on TDD. Further, the IAB node 1102 DU may receive from and transmit to the child IAB node 1106 MT over the second frequency carrier based on TDD. Each of the first frequency carrier or the second frequency carrier may be configured with its respective TDD pattern for the TDD communication. Accordingly, higher or more efficient resource utilization may be achieved with the simultaneous operation with the paired spectrum. In some aspects, a UE 1108 may not be able to detect the IAB node 1102, as shown at 1150, because the UE 1108 may not include the second frequency carrier as part of its initial search carrier frequencies. Further, a UE 1110 may not be able to access the parent IAB node 1104, as shown at 1151, because the UE 1110 may expect FDD communications over the paired spectrum. In this scenario, a MIB or a SIB may be configured to indicate that the parent IAB node 1004 may be accessible to a child IAB node MT and not to a UE.

In FIG. 11B, the IAB node 1102 MT may receive from and transmit to the parent IAB node 1104 DU over the second frequency carrier based on TDD. Further, the IAB node 1102 DU may receive from and transmit to the child IAB node 1106 MT over the first frequency carrier based on TDD. Each of the first frequency carrier or the second frequency carrier may be configured with its respective TDD pattern for the TDD communication. Accordingly, higher or more efficient resource utilization may be achieved with the simultaneous operation with the paired spectrum. In some aspects, a UE 1108 may not be able to access the IAB node 1102, e.g., as shown at 1153, for similar reasons that the UE 1110 may not be able to access the parent IAB node 1104 in FIG. 11A. In this scenario, a MIB or a SIB may be configured to indicate that the IAB node 1102 may be accessible to a child IAB node MT and not to a UE. Further, a UE 1110 may not be able to detect the parent IAB node 1104, e.g., as shown at 1155, for similar reasons that the UE 1108 may not be able to detect the IAB node 1102 in FIG. 11A.

Figure 12:
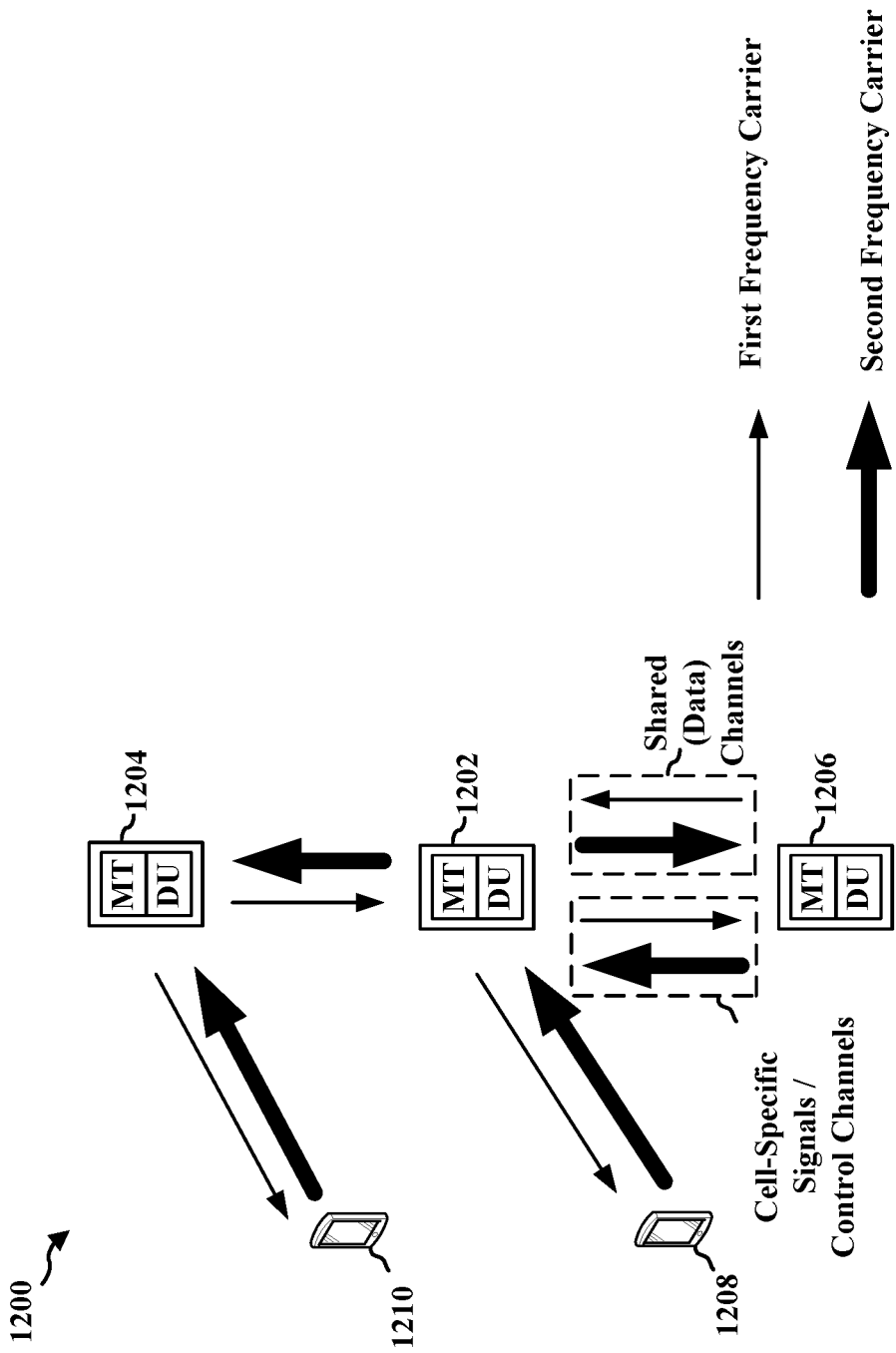
FIG. 12 is a diagram illustrating communications between IAB nodes according to aspects.

FIG. 12 is a diagram 1200 illustrating communications between IAB nodes according to aspects presented herein. The IAB nodes 1202, 1204, 1206 may correspond to the IAB nodes 802, 804, 806 in FIG. 8, respectively. The UE 1208 may correspond to the UE 1208 in FIG. 8. Further, the parent IAB node 1204 may serve as the AN for the UE 1210. The IAB node 1202 MT may receive from the parent IAB node 1204 DU (i.e., downlink) over the first frequency carrier, and may transmit to the parent node 1204 DU (i.e., uplink) over the second frequency carrier. Further, for cell-specific signals and physical control channels of the backhaul link, the IAB node 1102 DU may transmit to the child IAB node 1106 MT (i.e., downlink) over the first frequency carrier, and may receive from the child IAB node 1106 MT (i.e., uplink) over the second frequency carrier. Examples of the cell-specific signals may include the SSB, the CSI-RS, the SRS, and the PRACH. Examples of the physical control channels may include the PDCCH and the PUCCH. On the other hand, for physical shared/data channels of the backhaul link, the IAB node 1102 DU may transmit to the child IAB node 1106 MT (i.e., downlink) over the second frequency carrier, and may receive from the child IAB node 1106 MT (i.e., uplink) over the first frequency carrier. Examples of the physical shared/data channels may include the PDSCH and the PUSCH. Accordingly, higher or more efficient resource utilization may be achieved with the simultaneous operation with the paired spectrum. Because the IAB node 1102 may use different frequency carriers for either uplink or downlink depending on the backhaul link physical channel involved, the IAB node 1102 may be referred to as operating in a mixed mode. In additional mixed modes and in general, the IAB node 1102 may use the first frequency carrier and the second frequency carrier to transmit and receive different physical channels or signals. In particular, the IAB node 1102 may use the first frequency carrier to transmit and receive a first subset of physical channels or signals, and may use the second frequency carrier to transmit and receive a second subset of physical channels or signals. In one aspect, a UE 1108 may be able to access the IAB node 1102 as normal when the IAB node 1102 is operating in the mixed mode because the access IAB node 1102 may schedule different time slots for the communication with the UE 1108 and for the communication with the child IAB node 1106 MT, such that for the UE 1108's time slots, the IAB node 1102 may use the first frequency carrier for the downlink transmission, and may use the second frequency carrier for the uplink transmission, as expected by the UE 1108.

Referring back to FIG. 8, at 818, the IAB node 802 may report to the associated CU 810 the transmission modes supported by a cell provided by the IAB node 802. The supported modes may include one or more mixed modes, and may further include an FDD mode and/or a TDD mode. The report may be transmitted via the F1-AP interface between the CU 810 and the IAB node 802 DU. At 820, the CU 810 may transmit a configuration of the paired spectrum (e.g., the configuration of the first frequency carrier or the second frequency carrier, or the configuration of the uplink or the downlink) to the IAB node 802 via the F1-AP interface. The configuration transmitted by the CU 810 may include an overriding configuration. In other words, the configuration transmitted by the CU 810 may include a transmission mode that is different from a transmission mode reported by the IAB node 802. In one example, over the F1-AP interface, the IAB node 802 DU may be configured with the first frequency carrier and the second frequency carrier where each frequency carrier is configured with a separate TDD pattern. Further, over the Uu interface, the serving cell may be configured with the first frequency carrier and the second frequency carrier where each frequency carrier is configured with a separate TDD pattern. The CU 810 may also transmit an activation or deactivation command to the IAB node 802 DU.

At 816, the IAB node 802 may transmit downlink transmissions to the UE 808 on an access link over the first frequency carrier of the paired spectrum, or receive uplink transmissions from the UE 808 on the access link over the second frequency carrier of the paired spectrum.

In one aspect, when the CU provides the H/S/NA (for FDD) or TDD configurations for the downlink and uplink parts of an IAB node DU cell operating with a paired spectrum, the CU may label, e.g., the first frequency carrier as an uplink part of the paired spectrum and the second frequency carrier as a downlink part of the paired spectrum. For resources (e.g., frequency carriers) labeled this way, the IAB node DU may use these resources for backhaul communications with the child IAB node MT. In one aspect, the CU may override the uplink frequency information (e.g., "UL freqInfo") and the downlink frequency information (e.g., "DL freqInfo") configurations of a cell in the list of the IAB node DU served cells when the CU activates the cell. This may include swapping the downlink and uplink frequencies (e.g., to configure the IAB node 902 DU in FIG. 9A).

Figure 13:
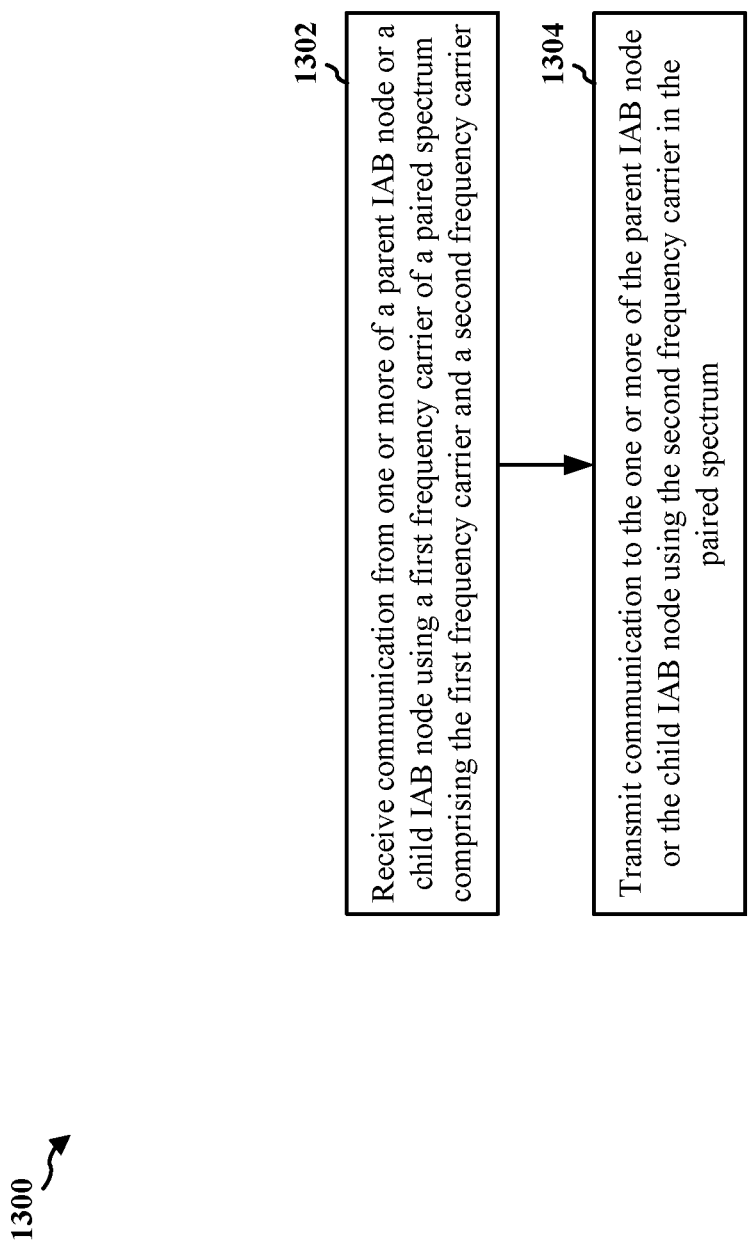
FIG. 13 is a flowchart of a method of wireless communication.

FIG. 13 is a flowchart 1300 of a method of wireless communication. The method may be performed by an IAB node (e.g., the IAB node 102/103/180/802/902/1002/1102/ 1202; the apparatus 1502). At 1302, the IAB node may receive communication from one or more of a parent IAB node or a child IAB node using a first frequency carrier of a paired spectrum including the first frequency carrier and a second frequency carrier. For example, 1302 may be performed by the first carrier component 1540 in FIG. 15. For example, FIG. 8 at 812*a*, 812*b* illustrates the IAB node 802 receiving communication from one or more of a parent IAB node 804 or a child IAB node 806 using a first frequency carrier of a paired spectrum including the first frequency carrier and a second frequency carrier.

At 1304, the IAB node may transmit communication to the one or more of the parent IAB node or the child IAB node using the second frequency carrier in the paired spectrum. For example, 1304 may be performed by the second carrier component 1542 in FIG. 15. For example, FIG. 8 at 814*a*, 814*b* illustrates the IAB node 802 transmitting communication to the one or more of the parent IAB node 804 or the child IAB node 806 using the second frequency carrier in the paired spectrum. In one configuration, at least one of the first frequency carrier or the second frequency carrier in the paired spectrum may carry both uplink and downlink communication.

Figure 14:
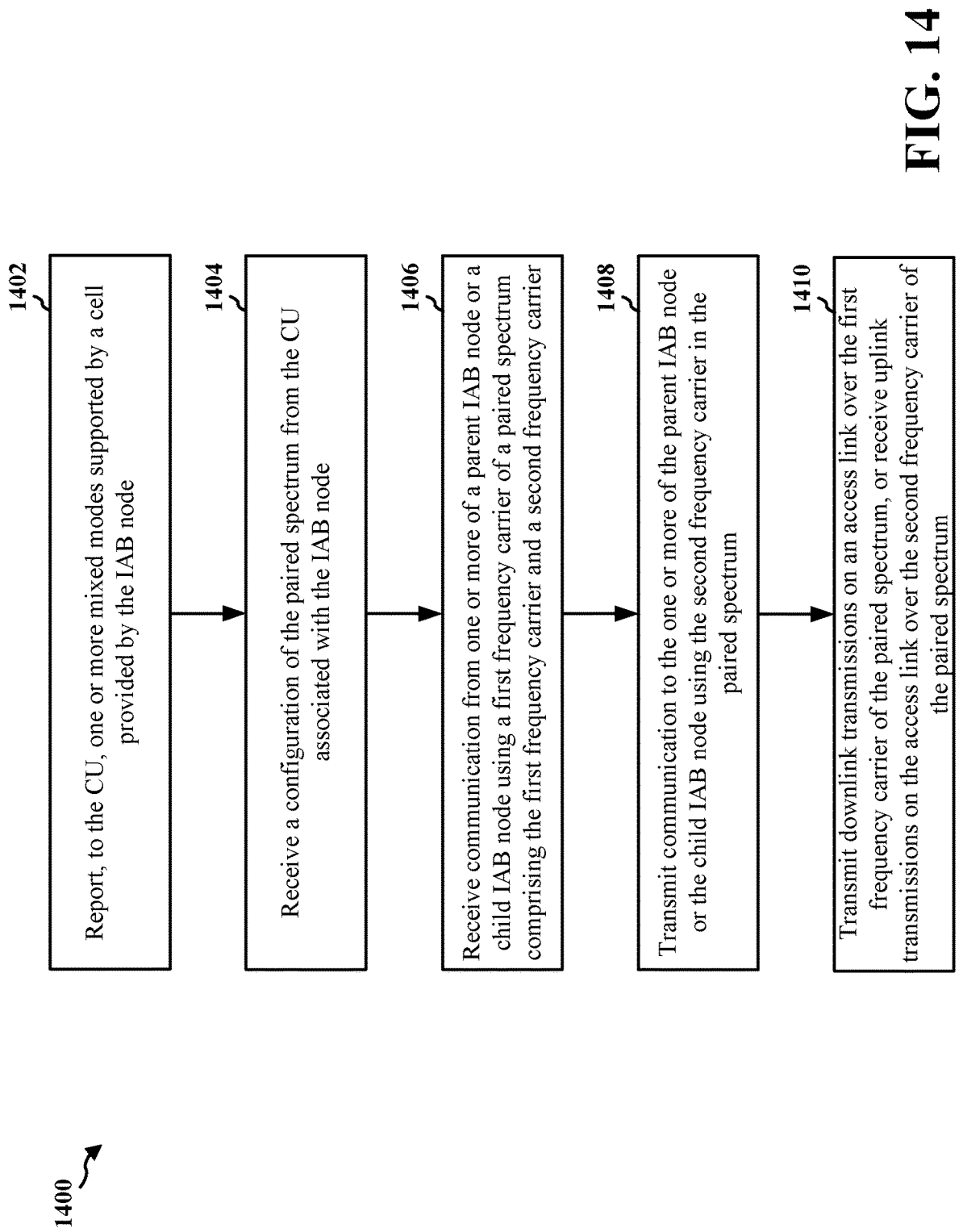
FIG. 14 is a flowchart of a method of wireless communication.

FIG. 14 is a flowchart 1400 of a method of wireless communication. The method may be performed by an IAB node (e.g., the IAB node 102/103/180/802/902/1002/1102/ 1202; the apparatus 1502). At 1406, the IAB node may receive communication from one or more of a parent IAB node or a child IAB node using a first frequency carrier of a paired spectrum including the first frequency carrier and a second frequency carrier. For example, 1406 may be performed by the first carrier component 1540 in FIG. 15. For example, FIG. 8 at 812*a*, 812*b* illustrates the IAB node 802 receiving communication from one or more of a parent IAB node 804 or a child IAB node 806 using a first frequency carrier of a paired spectrum including the first frequency carrier and a second frequency carrier.

At 1408, the IAB node may transmit communication to the one or more of the parent IAB node or the child IAB node using the second frequency carrier in the paired spectrum. For example, 1408 may be performed by the second carrier component 1542 in FIG. 15. For example, FIG. 8 at 814*a*, 814*b* illustrates the IAB node 802 transmitting communication to the one or more of the parent IAB node 804 or the child IAB node 806 using the second frequency carrier in the paired spectrum. In one configuration, at least one of the first frequency carrier or the second frequency carrier in the paired spectrum may carry both uplink and downlink communication.

In some aspects, the IAB node may simultaneously receive from the parent IAB node and from the child IAB node over the first frequency carrier of the paired spectrum, or may simultaneously transmit to the parent IAB node and to the child IAB node over the second frequency carrier of the paired spectrum. For example, FIG. 9A illustrates the IAB node 902 simultaneously receiving from the parent IAB node 904 and from the child IAB node 906 over the first frequency carrier of the paired spectrum, or simultaneously transmitting to the parent IAB node 904 and to the child IAB node 906 over the second frequency carrier of the paired spectrum.

In some aspects, the IAB node may simultaneously receive from the parent IAB node and from the child IAB node with SDM, or may simultaneously transmit to the parent IAB node and to the child IAB node with SDM. For example, FIG. 9A illustrates the IAB node 902 simultaneously receiving from the parent IAB node 904 and from the child IAB node 906 with SDM, or simultaneously transmitting to the parent IAB node 904 and to the child IAB node 906 with SDM.

In some aspects, the IAB node may receive and transmit simultaneously using at least one of the first frequency carrier or the second frequency carrier of the paired spectrum. For example, FIG. 9A illustrates the IAB node 902 receiving and transmitting simultaneously using at least one of the first frequency carrier or the second frequency carrier of the paired spectrum.

In some aspects, the IAB node may be inaccessible by a UE. For example, FIG. 9A illustrates the IAB node 902 being inaccessible by a UE 908. In one configuration, at least one of a MIB or a SIB may indicate that a cell is accessible by an MT of the child IAB node and not by the UE.

At 1410, the IAB node may transmit downlink transmissions on an access link over the first frequency carrier of the paired spectrum, or may receive uplink transmissions on the access link over the second frequency carrier of the paired spectrum. For example, 1410 may be performed by the access link component 1544 in FIG. 15. For example, FIG. 8 at 816 and FIG. 12 illustrate the IAB node 802/1202 transmitting downlink transmissions on an access link over the first frequency carrier of the paired spectrum, or receiving uplink transmissions on the access link over the second frequency carrier of the paired spectrum.

In some aspects, the IAB node may use one or both of the first frequency carrier or the second frequency carrier to communicate for at least some physical channels of a backhaul link including first physical channels in downlink or uplink directions different from access link downlink or uplink directions of the access link. For example, FIG. 12 illustrates the IAB node 1202 using one or both of the first frequency carrier or the second frequency carrier to communicate for at least some physical channels of a backhaul link including first physical channels in downlink or uplink directions different from access link downlink or uplink directions of the access link. In one configuration, the first physical channel may include at least shared channels of the backhaul link.

In some aspects, the IAB node may use one or both of the first frequency carrier or the second frequency carrier to communicate for second physical channels of a backhaul link in downlink or uplink directions same as access link downlink or uplink directions of the access link. For example, FIG. 12 illustrates the IAB node 1202 using one or both of the first frequency carrier or the second frequency carrier to communicate for second physical channels of a backhaul link in downlink or uplink directions same as access link downlink or uplink directions of the access link. In one configuration, the second physical channels may include at least cell-specific signals or control channels of the backhaul link.

In some aspects, the IAB node may communicate with one or more of the parent IAB node or the child IAB node over the paired spectrum based on TDD. The IAB node may use each frequency carrier of the paired spectrum based on TDD. For example, FIGS. 10A, 10B, 11A, 11B illustrate the IAB node 1002/1102 communicating with one or more of the parent IAB node 1004/1104 or the child IAB node 1006/1106 over the paired spectrum based on TDD.

In some aspects, the IAB node may use the first frequency carrier of the paired spectrum to communication with the parent IAB node based on a first TDD pattern, and may use the second frequency carrier of the paired spectrum to communicate with the child IAB node based on a second TDD pattern different from the first TDD pattern. For example, FIG. 11A illustrates the IAB node 1102 using the first frequency carrier of the paired spectrum to communication with the parent IAB node 1104 based on a first TDD pattern, and using the second frequency carrier of the paired spectrum to communicate with the child IAB node 1106 based on a second TDD pattern different from the first TDD pattern.

In some aspects, the IAB node may use the paired spectrum to communicate with the parent IAB node based on TDD. For example, FIG. 10B illustrates the IAB node 1002 using the paired spectrum to communicate with the parent IAB node 1004 based on TDD.

In some aspects, the IAB node may use the paired spectrum to communicate with the child IAB node based on TDD. For example, FIG. 10A illustrates the IAB node 1002 using the paired spectrum to communicate with the child IAB node 1106 based on TDD.

In some aspects, the IAB node may be inaccessible by a UE. For example, FIG. 10A illustrates the IAB node 1002 being inaccessible by a UE 1008. In one configuration, at least one of a MIB or a SIB may indicate that a cell is accessible by an MT of the child IAB node and not by the UE.

At 1404, the IAB node may receive a configuration of the paired spectrum from a CU associated with the IAB node. For example, 1404 may be performed by the configuration component 1548 in FIG. 15. For example, FIG. 8 at 820 illustrates the IAB node 802 receiving a configuration of the paired spectrum from a CU 810 associated with the IAB node 802.

Prior to 1404, at 1402, the IAB node may report, to the CU, one or more mixed modes supported by a cell provided by the IAB node. For example, 1402 may be performed by the report component 1546 in FIG. 15. For example, FIG. 8 at 818 illustrates the IAB node 802 reporting, to the CU 810, one or more mixed modes supported by a cell provided by the IAB node 802.

In some aspects, the one or more mixed modes may include at least one of an FDD mixed mode or a TDD mixed mode.

In some aspects, the configuration of the paired spectrum may be based on a mode that is different from the one or more mixed modes reported to the CU.

FIG. 15 is a diagram 1500 illustrating an example of a hardware implementation for an apparatus 1502. The apparatus 1502 may be an IAB node, a component of an IAB node, or may implement IAB node functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the device 310 and may include the memory 376 and/or at least one of the TX processor 316, the RX processor 370, and the controller/processor 375.

The communication manager 1532 includes a first carrier component 1540 that may be configured to receive communication from one or more of a parent IAB node or a child IAB node using a first frequency carrier of a paired spectrum including the first frequency carrier and a second frequency carrier, e.g., as described in connection with 1302 in FIGS. 13 and 1406 in FIG. 14. The communication manager 1532 further includes a second carrier component 1542 that may be configured to transmit communication to the one or more of the parent IAB node or the child IAB node using the second frequency carrier in the paired spectrum, e.g., as described in connection with 1304 in FIGS. 13 and 1408 in FIG. 14. The communication manager 1532 further includes an access link component 1544 that may be configured to transmit downlink transmissions on an access link over the first frequency carrier of the paired spectrum, or receive uplink transmissions on the access link over the second frequency carrier of the paired spectrum, e.g., as described in connection with 1410 in FIG. 14. The communication manager 1532 further includes a report component 1546 that may be configured to report, to the CU, one or more mixed modes supported by a cell provided by the IAB node, e.g., as described in connection with 1402 in FIG. 14. The communication manager 1532 further includes a configuration component 1548 that may be configured to receive a configuration of the paired spectrum from a CU associated with the IAB node, e.g., as described in connection with 1404 in FIG. 14.

The apparatus may include additional components that perform each of the blocks of the algorithm in the flowcharts of FIGS. 8, 13, and 14. As such, each block in the flowcharts of FIGS. 8, 13, and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for receiving communication from one or more of a parent IAB node or a child IAB node using a first frequency carrier of a paired spectrum including the first frequency carrier and a second frequency carrier. The apparatus 1502, and in particular the baseband unit 1504, may further include means for transmitting communication to the one or more of the parent IAB node or the child IAB node using the second frequency carrier in the paired spectrum. In one configuration, at least one of the first frequency carrier or the second frequency carrier in the paired spectrum may carry both uplink and downlink communication.

In some aspects, the apparatus 1502 may simultaneously receive from the parent IAB node and from the child IAB node over the first frequency carrier of the paired spectrum, or may simultaneously transmit to the parent IAB node and to the child IAB node over the second frequency carrier of the paired spectrum. In one configuration, the apparatus 1502 may simultaneously receive from the parent IAB node and from the child IAB node with SDM, or may simultaneously transmit to the parent IAB node and to the child IAB node with SDM. In one configuration, the apparatus 1502 may receive and transmit simultaneously using at least one of the first frequency carrier or the second frequency carrier of the paired spectrum. In one configuration, the apparatus 1502 may be inaccessible by a UE. In one configuration, at least one of a MIB or a SIB may indicate that a cell is accessible by an MT of the child IAB node and not by the UE. The apparatus 1502 may further include means for transmitting downlink transmissions on an access link over the first frequency carrier of the paired spectrum, or for receiving uplink transmissions on the access link over the second frequency carrier of the paired spectrum. In one configuration, the apparatus 1502 may use one or both of the first frequency carrier or the second frequency carrier to communicate for at least some physical channels of a backhaul link including first physical channels in downlink or uplink directions different from access link downlink or uplink directions of the access link. In one configuration, the first physical channel may include at least shared channels of the backhaul link. In one configuration, the apparatus 1502 may use one or both of the first frequency carrier or the second frequency carrier to communicate for second physical channels of a backhaul link in downlink or uplink directions same as access link downlink or uplink directions of the access link. In one configuration, the second physical channels may include at least cell-specific signals or control channels. In one configuration, the apparatus 1502 may communicate with one or more of the parent IAB node or the child IAB node over the paired spectrum based on TDD. The apparatus 1502 may use each frequency carrier of the paired spectrum based on TDD. In one configuration, the apparatus 1502 may use the first frequency carrier of the paired spectrum to communication with the parent IAB node based on a first TDD pattern, and may use the second frequency carrier of the paired spectrum to communicate with the child IAB node based on a second TDD pattern different from the first TDD pattern. In one configuration, the apparatus 1502 may use the paired spectrum to communicate with the parent IAB node based on TDD. In one configuration, the apparatus 1502 may use the paired spectrum to communicate with the child IAB node based on TDD. In one configuration, the apparatus 1502 may be inaccessible by a UE. In one configuration, at least one of a MIB or a SIB may indicate that a cell is accessible by an MT of the child IAB node and not by the UE. The apparatus 1502 may further include means for receiving a configuration of the paired spectrum from a CU associated with the apparatus 1502. The apparatus 1502 may further include means for reporting, to the CU, one or more mixed modes supported by a cell provided by the apparatus 1502. In one configuration, the one or more mixed modes may include at least one of an FDD mixed mode or a TDD mixed mode. In one configuration, the configuration of the paired spectrum may be based on a mode that is different from the one or more mixed modes reported to the CU.

The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Therefore, aspects relate to techniques of utilizing at an IAB node the paired spectrum to simultaneously transmit and receive, to and from, one or more of a parent IAB node or a child IAB node. Better spectral efficiency may be achieved with aspects described herein.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means."

As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of an IAB node, including: receiving first communication from one or more of a parent IAB node or a child IAB node using a first frequency carrier of a paired spectrum including the first frequency carrier and a second frequency carrier; and transmitting second communication to the one or more of the parent IAB node or the child IAB node using the second frequency carrier in the paired spectrum, where at least one of the first frequency carrier or the second frequency carrier in the paired spectrum carries both uplink and downlink communication.

Aspect 2 is the method of aspect 1, where the IAB node simultaneously receives from the parent IAB node and from the child IAB node over the first frequency carrier of the paired spectrum, or simultaneously transmits to the parent IAB node and to the child IAB node over the second frequency carrier of the paired spectrum.

Aspect 3 is the method of aspect 2, where the IAB node simultaneously receives from the parent IAB node and from the child IAB node with SDM, or simultaneously transmits to the parent IAB node and to the child IAB node with the SDM.

Aspect 4 is the method of any of aspects 2 and 3, where the IAB node receives and transmits simultaneously using at least one of the first frequency carrier or the second frequency carrier of the paired spectrum.

Aspect 5 is the method of any of aspects 2 to 4, where the IAB node is inaccessible by a UE.

Aspect 6 is the method of aspect 5, where at least one of a MIB or a SIB indicates that a cell is accessible by an MT of the child IAB node and not by the UE.

Aspect 7 is the method of any of aspects 2 to 4, further including: transmitting downlink transmissions on an access link over the first frequency carrier of the paired spectrum, or receiving uplink transmissions on the access link over the second frequency carrier of the paired spectrum.

Aspect 8 is the method of aspect 7, where the IAB node uses one or both of the first frequency carrier or the second frequency carrier to communicate for at least some physical channels of a backhaul link including first physical channels in downlink or uplink directions different from access link downlink or uplink directions of the access link.

Aspect 9 is the method of aspect 8, where the first physical channels include at least shared channels of the backhaul link.

Aspect 10 is the method of aspect 7, where the IAB node uses one or both of the first frequency carrier or the second frequency carrier to communicate for second physical channels of a backhaul link in downlink or uplink directions same as access link downlink or uplink directions of the access link.

Aspect 11 is the method of aspect 10, where the second physical channels include at least cell-specific signals or control channels of the backhaul link.

Aspect 12 is the method of aspect 1, where the IAB node communicates with one or more of the parent IAB node or the child IAB node over the paired spectrum based on TDD, where the IAB node uses each frequency carrier of the pair spectrum based on the TDD.

Aspect 13 is the method of aspect 12, where the IAB node uses the first frequency carrier of the paired spectrum to communication with the parent IAB node based on a first TDD pattern, and uses the second frequency carrier of the paired spectrum to communicate with the child IAB node based on a second TDD pattern different from the first TDD pattern.

Aspect 14 is the method of aspect 12, where the IAB node uses the paired spectrum to communicate with the parent IAB node based on the TDD.

Aspect 15 is the method of aspect 12, where the IAB node uses the paired spectrum to communicate with the child IAB node based on the TDD.

Aspect 16 is the method of any of aspects 12 to 15, where the IAB node is inaccessible by a UE.

Aspect 17 is the method of aspect 16, where at least one of a MIB or a SIB indicates that a cell is accessible by a mobile termination (MT) of the child IAB node and not by the UE.

Aspect 18 is the method of any of aspects 1 to 17, further including: receiving a configuration of the paired spectrum from a CU associated with the IAB node.

Aspect 19 is the method of aspect 18, further including: reporting, to the CU, one or more mixed modes supported by a cell provided by the IAB node.

Aspect 20 is the method of aspect 19, where the one or more mixed modes include at least one of an FDD mixed mode or a TDD mixed mode.

Aspect 21 is the method of any of aspects 19 and 20, where the configuration of the paired spectrum is based on a mode that is different than the one or more mixed modes reported to the CU.

Aspect 22 is an apparatus for wireless communication including means for implementing any of aspects 1 to 21.

In aspect 23, the apparatus of aspect 22 further includes at least one transceiver.

In aspect 24, the apparatus of aspect 22 or 23 further includes at least one antenna.

Aspect 25 is an apparatus for wireless communication including at least one processor coupled to a memory and configured to implement a method as in any of aspects 1 to 21.

In aspect 26, the apparatus of aspect 25 further includes at least one transceiver coupled to the at least one processor.

In aspect 27, the apparatus of aspect 25 or 26 further includes at least one antenna coupled to the at least one processor.

Aspect 28 is a non-transitory computer-readable medium storing computer executable code, where the code when executed by a processor causes the processor to implement any of aspects 1 to 21.

What is claimed is:

1. An apparatus for wireless communication at an integrated access and backhaul (IAB) node, comprising:
    one or more memories; and
    at least one processor coupled to the one or more memories and configured to:
        receive first communication from one or more of a parent IAB node or a child IAB node using a first frequency carrier of a paired spectrum comprising the first frequency carrier and a second frequency carrier; and
        transmit second communication to the one or more of the parent IAB node or the child IAB node using the second frequency carrier in the paired spectrum,
        wherein at least one of the first frequency carrier or the second frequency carrier in the paired spectrum carries both uplink and downlink communication.

2. The apparatus of claim 1, wherein the IAB node simultaneously receives from the parent IAB node and from the child IAB node over the first frequency carrier of the paired spectrum, or simultaneously transmits to the parent IAB node and to the child IAB node over the second frequency carrier of the paired spectrum.

3. The apparatus of claim 2, wherein the IAB node simultaneously receives from the parent IAB node and from the child IAB node with spatial division multiplexing (SDM), or simultaneously transmits to the parent IAB node and to the child IAB node with the SDM.

4. The apparatus of claim 2, wherein the IAB node receives and transmits simultaneously using at least one of the first frequency carrier or the second frequency carrier of the paired spectrum.

5. The apparatus of claim 2, wherein the IAB node is inaccessible by a user equipment (UE).

6. The apparatus of claim 5, wherein at least one of a master information block (MIB) or a system information block (SIB) indicates that a cell is accessible by a mobile termination (MT) of the child IAB node and not by the UE.

7. The apparatus of claim 2, the at least one processor being further configured to:
transmit downlink transmissions on an access link over the first frequency carrier of the paired spectrum, or receiving uplink transmissions on the access link over the second frequency carrier of the paired spectrum.

8. The apparatus of claim 7, wherein the IAB node uses one or both of the first frequency carrier or the second frequency carrier to communicate for at least some physical channels of a backhaul link including first physical channels in downlink or uplink directions different from access link downlink or uplink directions of the access link.

9. The apparatus of claim 8, wherein the first physical channels comprise at least shared channels of the backhaul link.

10. The apparatus of claim 7, wherein the IAB node uses one or both of the first frequency carrier or the second frequency carrier to communicate for second physical channels of a backhaul link in downlink or uplink directions same as access link downlink or uplink directions of the access link.

11. The apparatus of claim 10, wherein the second physical channels comprise at least cell-specific signals or control channels of the backhaul link.

12. The apparatus of claim 1, wherein the IAB node communicates with one or more of the parent IAB node or the child IAB node over the paired spectrum based on time division duplexing (TDD), wherein the IAB node uses each frequency carrier of the paired spectrum based on the TDD.

13. The apparatus of claim 12, wherein the IAB node uses the first frequency carrier of the paired spectrum to receive the first communication with the parent IAB node based on a first TDD pattern, and uses the second frequency carrier of the paired spectrum to communicate with the child IAB node based on a second TDD pattern different from the first TDD pattern.

14. The apparatus of claim 12, wherein the IAB node uses the paired spectrum to communicate with the parent IAB node based on the TDD.

15. The apparatus of claim 12, wherein the IAB node uses the paired spectrum to communicate with the child IAB node based on the TDD.

16. The apparatus of claim 12, wherein the IAB node is inaccessible by a user equipment (UE).

17. The apparatus of claim 16, wherein at least one of a master information block (MIB) or a system information block (SIB) indicates that a cell is accessible by a mobile termination (MT) of the child IAB node and not by the UE.

18. The apparatus of claim 1, the at least one processor being further configured to:
receive a configuration of the paired spectrum from a central unit (CU) associated with the IAB node.

19. The apparatus of claim 18, the at least one processor being further configured to:
report, to the CU, one or more mixed modes supported by a cell provided by the IAB node.

20. The apparatus of claim 19, wherein the one or more mixed modes comprise at least one of a frequency division duplex (FDD) mixed mode or a time division duplex (TDD) mixed mode.

21. The apparatus of claim 19, wherein the configuration of the paired spectrum is based on a mode that is different than the one or more mixed modes reported to the CU.

22. The apparatus of claim 1, further comprising a transceiver coupled to the at least one processor.

23. A method of wireless communication at an integrated access and backhaul (TAB) node, comprising:
receiving first communication from one or more of a parent TAB node or a child TAB node using a first frequency carrier of a paired spectrum comprising the first frequency carrier and a second frequency carrier; and
transmitting second communication to the one or more of the parent TAB node or the child TAB node using the second frequency carrier in the paired spectrum,
wherein at least one of the first frequency carrier or the second frequency carrier in the paired spectrum carries both uplink and downlink communication.

24. The method of claim 23, wherein the TAB node simultaneously receives from the parent TAB node and from the child TAB node over the first frequency carrier of the paired spectrum, or simultaneously transmits to the parent TAB node and to the child TAB node over the second frequency carrier of the paired spectrum.

25. The method of claim 24, wherein the TAB node simultaneously receives from the parent TAB node and from the child TAB node with spatial division multiplexing (SDM), or simultaneously transmits to the parent TAB node and to the child TAB node with the SDM.

26. The method of claim 24, wherein the IAB node receives and transmits simultaneously using at least one of the first frequency carrier or the second frequency carrier of the paired spectrum.

27. The method of claim 24, wherein the IAB node is inaccessible by a user equipment (UE).

28. The method of claim 27, wherein at least one of a master information block (MIB) or a system information block (SIB) indicates that a cell is accessible by a mobile termination (MT) of the child IAB node and not by the UE.

29. An apparatus for wireless communication at an integrated access and backhaul (IAB) node, comprising:
means for receiving first communication from one or more of a parent IAB node or a child IAB node using a first frequency carrier of a paired spectrum comprising the first frequency carrier and a second frequency carrier; and
means for transmitting second communication to the one or more of the parent IAB node or the child IAB node using the second frequency carrier in the paired spectrum,
wherein at least one of the first frequency carrier or the second frequency carrier in the paired spectrum carries both uplink and downlink communication.

30. A non-transitory computer-readable medium storing computer executable code at an integrated access and backhaul (IAB) node, the code when executed by at least one processor causes the at least one processor to:
- receive first communication from one or more of a parent IAB node or a child IAB node using a first frequency carrier of a paired spectrum comprising the first frequency carrier and a second frequency carrier; and
- transmit second communication to the one or more of the parent IAB node or the child IAB node using the second frequency carrier in the paired spectrum,
- wherein at least one of the first frequency carrier or the second frequency carrier in the paired spectrum carries both uplink and downlink communication.

\* \* \* \* \*